(12) United States Patent
Luo

(10) Patent No.: US 11,620,476 B2
(45) Date of Patent: Apr. 4, 2023

(54) METHODS AND APPARATUS FOR PERFORMING ANALYTICS ON IMAGE DATA

(71) Applicant: Micron Technology, Inc., Boise, ID (US)

(72) Inventor: Fa-Long Luo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 151 days.

(21) Appl. No.: 16/874,504

(22) Filed: May 14, 2020

(65) Prior Publication Data
US 2021/0357691 A1 Nov. 18, 2021

(51) Int. Cl.
*G06K 9/62* (2022.01)
*G06N 20/00* (2019.01)
*G06V 10/143* (2022.01)
*G06V 40/16* (2022.01)

(52) U.S. Cl.
CPC .......... *G06K 9/6257* (2013.01); *G06N 20/00* (2019.01); *G06V 10/143* (2022.01); *G06V 40/166* (2022.01)

(58) Field of Classification Search
CPC .... G06K 9/6257; G06N 20/00; G06V 40/166; G06V 10/143; G06V 10/776
See application file for complete search history.

(56) References Cited

U.S. PATENT DOCUMENTS

| | | | | |
|---|---|---|---|---|
| 10,460,231 B2 * | 10/2019 | Zhang | ................ | G06N 3/0454 |
| 11,161,456 B1 * | 11/2021 | Day | .......................... | B60R 1/00 |
| 2016/0094814 A1 * | 3/2016 | Gousev | ................... | H04N 7/183 |
| | | | | 348/143 |
| 2018/0068206 A1 * | 3/2018 | Pollach | ................ | G06V 20/58 |
| 2018/0173986 A1 * | 6/2018 | Gousev | ............... | G06V 40/193 |
| 2018/0322337 A1 * | 11/2018 | Marty | ....................... | G06T 7/20 |
| 2018/0341858 A1 * | 11/2018 | Otterstedt | ............ | G06V 10/143 |
| 2019/0050685 A1 | 2/2019 | Kaminski et al. | | |
| 2019/0258878 A1 * | 8/2019 | Koivisto | .............. | G06V 10/762 |
| 2019/0320127 A1 | 10/2019 | Buckler et al. | | |
| 2019/0384303 A1 * | 12/2019 | Muller | .................... | G01S 7/417 |
| 2020/0082852 A1 * | 3/2020 | Golov | ....................... | G11C 8/12 |

(Continued)

FOREIGN PATENT DOCUMENTS

| | | | | |
|---|---|---|---|---|
| CA | 3075544 A1 * | 4/2019 | .......... | G06N 3/0454 |
| WO | WO-2018154494 A1 * | 8/2018 | ......... | G06F 9/45533 |
| WO | WO2021231183 | 11/2021 | | |

OTHER PUBLICATIONS

Lubana E.S., et al., "Minimalistic Image Signal Processing ForDeep Learning Applications," IEEE International Conference on Image Processing, 2019, pp. 4165-4166.

*Primary Examiner* — Carol Wang
(74) *Attorney, Agent, or Firm* — Greenberg Traurig

(57) ABSTRACT

Methods and apparatus for applying data analytics such as deep learning algorithms to sensor data. In one embodiment, an electronic device such as a camera apparatus including a deep learning accelerator (DLA) communicative with an image sensor is disclosed, the camera apparatus configured to evaluate unprocessed sensor data from the image sensor using the DLA. In one variant, the camera apparatus provides sensor data directly to the DLA, bypassing image signal processing in order to improve the effectiveness the DLA, obtain DLA results more quickly than using conventional methods, and further allow the camera apparatus to conserve power.

20 Claims, 21 Drawing Sheets

(56) References Cited

U.S. PATENT DOCUMENTS

| | | | |
|---|---|---|---|
| 2020/0196024 A1* | 6/2020 | Hwang | G06T 1/20 |
| 2020/0210726 A1* | 7/2020 | Yang | G06V 10/454 |
| 2021/0048949 A1* | 2/2021 | Kale | G06F 3/0656 |
| 2021/0049839 A1* | 2/2021 | Bielby | G07C 5/008 |
| 2021/0056306 A1* | 2/2021 | Hu | G06K 9/6262 |
| 2021/0089803 A1* | 3/2021 | Lubana | G06K 9/6232 |
| 2021/0127090 A1* | 4/2021 | Kale | G06F 3/068 |
| 2021/0158096 A1* | 5/2021 | Sinha | H04N 9/04551 |
| 2021/0325898 A1* | 10/2021 | Golov | G05D 1/0276 |
| 2021/0390658 A1* | 12/2021 | Egorov | G06T 5/002 |

* cited by examiner

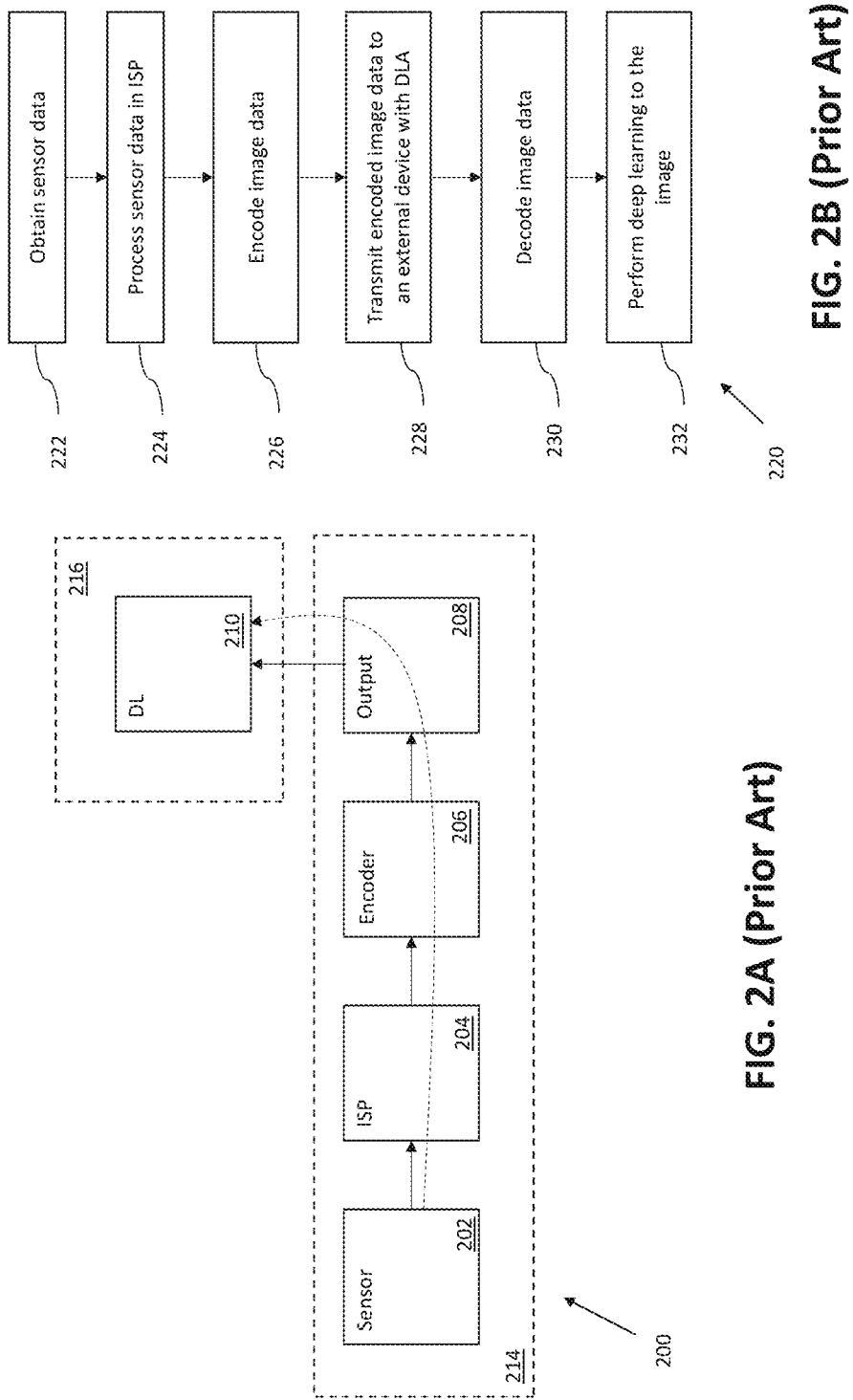

METHODS AND APPARATUS FOR PERFORMING ANALYTICS ON IMAGE DATA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to methods and apparatus of processing data captured by image sensors, and more specifically in one exemplary aspect to performing analytics such as deep learning algorithms on raw sensor data.

2. Description of Related Technology

Numerous types of data analytics have emerged in recent years. For example, so-called "deep learning" (or deep structured learning) algorithms are a type of machine learning that rely on artificial neural networks to perform their tasks.

Deep learning networks have been proven to be highly effective in various artificial intelligence applications, including computer vision applications used to e.g., detect and identify objects. Thus, systems that require computer vision capabilities might integrate a camera apparatus with hardware or software that implements deep learning-based computer vision.

Current computer vision methods, including those based on deep learning, are generally applied to digital images that have been formatted and processed primarily for display (i.e., digital images that are meant to be seen by humans). Most digital camera devices include onboard image signal processing (ISP) that performs a variety of operations in order to transform initial sensor data into image data that is (i) in a format that can be used to generate an image for display (e.g., JPEG), and (ii) associated with human perception (i.e., what a human finds visually desirable). Some common ISP operations, for example, include demosaicing, color space translation, color balancing, gamma correction, and optical correction. Image signal processors are typically linked directly to camera sensors, so that sensor data collected by a camera sensor is immediately transformed into "image data." Thus, any deep learning method associated with a camera device is conventionally performed on image data that has already been processed by an ISP.

FIG. 1A is a block diagram of a conventional camera system 100 having both an image signal processor (ISP) 104 and a deep learning accelerator (DLA) 110 integrated within the camera 112.

FIG. 1B illustrates a method 120 of using the camera system 100 of FIG. 1A. Specifically, in step 122 of the method 120, an image sensor 102 first obtains sensor data and transmits sensor data representing an image or video to an ISP 104.

In step 124, the ISP 104 performs various image processing functions on the sensor data to produce one or more image files. For example, the ISP operation may perform demosaicing and color space translation to transform individual photosensor data into red/green/blue (RGB) values associated with individual pixels in an image file. For example, if photosensors of the image sensor 102 are arranged into a non-rectangular grid, the ISP calculates values for image pixels that are arranged in a rectangular matrix.

In step 126, an encoder 106 encodes the image file and, in step 128, the encoded image file is transmitted to an external device via an output module 108 (e.g., a baseband processor unit such as a CPU or GPU or DSP).

In step 130, a deep learning algorithm within the DLA 110 is applied to the post-ISP image file(s). In step 132, the results of the DLA may be transmitted to an external device from the camera.

FIG. 2A illustrates a block diagram of another configuration of a conventional camera system 200, wherein an ISP 204 is integrated with the camera 214, and a deep learning program 210 is located on a device 216 external to the camera 214. FIG. 2B illustrates a method 220 of using the camera system 200 of FIG. 2A.

Steps 222-226 of the method 220 are performed in a similar manner to steps 122-126 of the method 120 of FIG. 1A.

In step 228, an encoded image file is transmitted to the external device 216 via the output module 208. The external device decodes the image file (step 230), and applies a deep learning algorithm 210 to the decoded image file data.

In each of the above-described conventional camera systems and methods, deep learning algorithms are applied to image/video data that has undergone image signal processing. Further, in the example of FIGS. 2A and 2B, the image data has also undergone encoding/compression, during which additional data may have been lost (e.g., due to "lossy" encoding or compression methods which by definition result in lost data).

One potential disability associated with such current camera solutions is that image signal processing often consumes considerable time and resources. This can prove critical in, e.g., computer vision systems that must quickly detect/identify objects, as well as camera systems that operate on limited battery power.

Other potential issues arise from the fact that during image signal processing, (i) some of the originally captured sensor data might be lost to compression/transformation (as in the configuration of FIGS. 2A and 2B discussed above), and (ii) some "extra" data might in some cases be added to the sensor data in order to force image/video to be visually pleasing to the human eye (such as e.g., where extra "green" data is added due to the enhanced sensitivity of the human eye to such wavelengths or visible light). Notably, machine learning methods do not require inputs of data in a specific format or with specific features, so there is no particular benefit to feeding "processed" image data into a deep learning operation. On the other hand, the performance of deep learning algorithms is generally speaking highly dependent on the amount of relevant information input to the underlying deep learning network(s). The more relevant data provided to a deep learning algorithm, the better its performance. Since post-ISP image files (i) do not include all of the originally captured sensor data due to e.g., lossy compression or other lossy processes, and (ii) may include additional non-relevant data introduced merely for visual display, using post-ISP image files to drive a deep learning network can produce suboptimal results.

Yet further, current image sensors are often designed and fabricated with ISP processing (and subsequent display to a human viewer) in mind. For example, camera sensors often include color filter arrays that overlay photosensor arrays. The color filter arrays allow different colors of light (e.g., red, blue, and green wavelength light) to be detected by different photosensors. One commonly used color filter is the Bayer filter, which as alluded to previously, creates twice as many green photosensors as red or blue ones. However, if the objective of a camera system is not to capture an image for display but rather to provide a maximum amount of information to a computer algorithm (e.g., to an analytical process such as a machine learning program), capturing too much green light information might be unnecessary and wasteful, and produce distorted or skewed results as compared to unenhanced data.

Based on the foregoing, improved methods and apparatus are needed which enable more optimized performance of data analytics such as deep learning algorithms. For instance, in the exemplary context of camera technologies, improvements are needed which provide more optimal ways of using machine learning algorithms to process and evaluate image data.

SUMMARY

The present disclosure addresses the foregoing needs by providing, inter alia, methods and apparatus for applying analytics such as deep learning algorithms directly to unprocessed sensor data.

In one aspect of the disclosure, an improved electronic apparatus capable of enhanced analytics is described. In one embodiment, the electronic apparatus includes a camera apparatus having at least one image sensor and at least one hardware accelerator. In one variant, the hardware accelerator comprises a machine learning accelerator such as a deep learning accelerator (DLA). The image sensor is configured to provide sensor data to the DLA, such as data that has not undergone image signal processing. In one implementation, the sensor data comprises digital values corresponding to the amounts of light sensed at individual photosensor elements of the image sensor (i.e., photosensor signals that have undergone analog-to-digital conversion). In another variant, the sensor data comprises analog signals proportional to the amounts of light sensed at the individual photosensor elements.

In another variant, the sensor data provided to the DLA comprises raw format image data (i.e., minimally processed data from the image sensor). In another variant, the sensor data provided to the DLA comprises pre-raw format image data (i.e., completely unprocessed data from the image sensor).

In one embodiment of the camera apparatus, the DLA includes at least one deep learning algorithm configured to evaluate sensor data. In one variant thereof, the DLA includes two or more deep learning algorithms configured to perform two different operations. In one implementation, a first DLA operation is configured to evaluate sensor data (i.e., raw or pre-raw format), and a second operation is configured to evaluate at least partially processed image data (i.e., data that has undergone at least one image signal processing operation).

In another embodiment, the DLA includes at least one deep learning algorithm configured to evaluate partially processed sensor data. In one variant, the partially processed sensor data comprises data that has undergone a prescribed portion of available image signal processor (ISP) operations.

For example, in one implementation, an ISP can generate partially processed sensor data by performing demosaicing/de-Bayering on raw format image data, but not performing any additional functions (e.g., gamma correction, noise reduction, color-space conversion, etc.). As such, completion of any operation within the ISP (while obeying any logical ordering relationships) can be used as a "jumping off point" for input to the DLA process(es).

In one variant, the DLA includes an object detection and/or object recognition algorithm. The algorithm(s) is/are configured to detect/recognize one or more of subjects and objects such as: faces, people, animals, type of action/movement, type of behavior, type of natural phenomena. In one implementation, the DLA algorithm is configured for facial detection, feature extraction, and facial matching.

In another embodiment, the at least one image sensor includes two or more image sensors, of which one image sensor is specialized in that it is optimized to generate sensor data for evaluation by the DLA (not optimized to generate sensor data for display/human perception after image signal processing), and includes at least some photosensors that are configured to generate sensor data that would normally be considered overexposed or underexposed (i.e., values that would generate images too dark/light for normal display). In one variant, the "specialized" image sensor is configured to operate at shutter speed or frame rate that is not optimal for human perception.

In another variant, the image sensor is configured to provide sensor data corresponding to amounts of detected light, wherein very small differences in amount of light (i.e., differences that would not be perceived by the human eye) are detected and accounted for in (and reflected in values of) the sensor data.

In yet another variant, the image sensor includes at least some photosensors that are sensitive to light outside the visual spectrum; e.g., the ultraviolet range and/or the infrared range.

In a further variant, the image sensor includes a wavelength/color filter array that is not optimized for one or more processes other than human perception. In one implementation, at least some parts of the wavelength filter array allow wavelengths that are outside of the (human) visual spectrum.

In another embodiment of the camera apparatus, the image sensor includes at least one photosensor array, comprising a plurality of individual photosensors/photosensor elements. The photosensors are arranged in a grid on a two-dimensional surface. In one variant, the photosensors are arranged in a rectangular grid. In another variant, the photosensors are arranged in a hexagonal grid. In a further variant, the two-dimensional surface is in the shape of a rectangle, circle, ellipse, or a polygon. In one implementation, the two-dimensional surface is flat, while in another two-dimensional surface is curved (e.g., convex, concave).

In yet another variant, the photosensors are arranged in a three-dimensional grid (e.g., some photosensor elements are deeper than others).

In a further embodiment of the camera apparatus, the at least one image sensor further includes at least one image sensor that is optimized for normal processing by an ISP and generation of an image/video for display to a human. In one variant, the image sensor includes a color filter array (CFA) optimized for generation of sensor data for human perception, such as a Bayer filter or an RGB filter.

In yet another embodiment of the camera apparatus, the at least one image sensor includes an image sensor that may be operated in two or more different modes; e.g., in a first mode to provide sensor data to an ISP, and in a second mode is configured to provide sensor data to the DLA. In one variant, the image sensor includes two distinct regions (one for the first mode, one for the second). In another variant, the photosensors associated with the two modes are intermixed with one another in a prescribed pattern (e.g., row-column with offset).

In one implementation, operation of the image sensor in the first mode requires/consumes more electrical power than operation of the image sensor in the second mode, and yields a different output from the second mode. For instance, the image sensor in a first mode generates sensor data that can be used to generate a digital image acceptable for display (i.e., one or more human perception related parameters of the image are at levels higher than predetermined threshold(s) of those parameters), and the image sensor in a second mode generates sensor data that cannot be used to generate a digital image acceptable for display (but rather is optimized for one or more analytics such as processing via a DLA).

In another variant, operating the image sensor in the first mode includes generating sensor data that corresponds to a light exposure that is considered to be within acceptable limits/range for human perception, and operating the image sensor in the second mode comprises generating at least some sensor data that corresponds to light exposure that is considered to be outside the acceptable range (e.g., overexposed or underexposed sensor data). In one implementation, at least some photosensor elements of the image sensor include gain and associated circuitry that may be used to adjust the light sensitivity of the photosensor elements.

In another variant, operating the image sensor in the first mode comprises generating sensor data corresponding only to light within the visual spectrum, and operating the image sensor in the second mode comprises generating at least a portion of sensor data that corresponds to light outside the visual spectrum.

In a further variant, sensor data from the first mode includes data associated with three or more wavelength ranges (e.g., RGB) and sensor data from the second mode includes data associated only with one or two wavelength ranges.

In one variant, operating in the first mode of the photosensor array comprises providing a first amount of power to all the photosensor elements (or circuitry related to photosensor elements) of the photosensor array and operating in the second mode comprises providing a second amount of power to all or select portions of the photosensor elements of the photosensor array, such as where the first amount of power is greater than the second amount of power.

In one embodiment, the applying ISP function(s) to sensor data generates image/video data. In one embodiment, the method further comprise: encoding/compressing the image/video data using an encoder to generate an encoded image/video file. Encoding the image data is performed by using an encoding algorithm on the image data. The encoding algorithm is selected from a plurality of encoding algorithms, based on at least DLA results. Based on particular DLA results, the method does not perform any compression/encoding on the image data.

In one aspect, a method of performing facial recognition is disclosed. In one embodiment, the method comprises: obtaining image sensor data; and evaluating the image sensor data using a deep learning algorithm, wherein the sensor data comprises data generated obtained by a photosensor array that has not been processed by an image signal processor (i.e. raw format data or pre-raw data).

In one embodiment, the method is configured to initially perform at least part of a facial recognition operation using the sensor data. In one approach, the method is configured to perform a first part of a facial recognition operation using sensor data; based on results of the first part of the facial recognition operation, process the sensor data using an image signal processor to obtain image data; and perform a second part of the facial recognition operation using image data (e.g., an image file) generated by the image signal processor. In one implementation, the first part of the facial recognition operation comprises face detection and the second part of the facial recognition operation comprises face matching. The first and second parts of the facial recognition operation are performed using e.g., a deep learning accelerator (DLA) that is connected to the image sensor. In another configuration, the first part of the facial recognition operation is performed using a DLA internal to a camera device and the second part of the facial recognition is performed external to the camera device.

In another aspect, a deep learning accelerator (DLA) configured to perform deep learning based evaluation of sensor data is disclosed. In one embodiment, the sensor data is raw format image data provided by one or more image sensors. In another embodiment, the sensor data is completely unprocessed sensor data (pre-raw) from one or more image sensors.

In a further aspect, a camera apparatus configured to selectively perform image signal processing on collected image sensor data is disclosed. In one variant, the camera apparatus includes logic for activating/deactivating one or more image signal processing operations based at least on DLA results. In one variant, the camera apparatus includes an image signal processing (ISP) chip configured to perform the image signal processing operations.

In yet another aspect, a method of selectively performing image signal processing on image sensor data is disclosed. In one embodiment, the method includes collecting sensor data, applying one or more deep learning algorithms to the sensor data, obtaining at least deep learning algorithm result, evaluating the deep learning algorithm result, and, based on the evaluation, making a determination of whether to apply image signal processing to the sensor data.

In another aspect, a method of conserving camera battery power is disclosed. In one embodiment, the method includes keeping a plurality of camera functions deactivated; and activating one or more of the plurality of camera functions in response to particular deep learning evaluation results. In one variant, the method includes collecting image sensor data and performing at least one deep learning evaluation on the image sensor data to obtain the deep learning evaluation results.

In a further aspect, system including at least one camera apparatus is disclosed. The at least one camera apparatus includes an image sensor and a machine learning accelerator. In one embodiment, the system is a surveillance system. In one implementation, the surveillance system is part of home surveillance, commercial or government property surveillance, and/or street surveillance. In one embodiment, the system is part of an autonomous or semi-autonomous driving vehicle. In one embodiment the system is a remote research or inspection system. In one variant, the remote research system is configured a wildlife research. In one implementation, the camera apparatus is configured for underwater operation.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In some variants, the foregoing IC includes the aforementioned DLA logic.

In a further aspect, a method of processing data generated from sensor apparatus is disclosed. In one embodiment, the method includes: obtaining sensor data from a sensor apparatus; processing the sensor data using a first processing entity to produce non-deterministic results; and selectively processing the sensor data using a second processing entity to produce deterministic results. In one variant, the selectively processing the sensor data using a second processing entity to produce deterministic results is based at least in part on the non-deterministic results.

In another aspect of the disclosure, a DLA-enabled device that includes a separate FPGA (configured with DLA logic) and memory/storage is disclosed.

In yet another aspect, an DLA-enabled ASIC is disclosed. In one embodiment, the ASIC is closely coupled with memory and storage (e.g., on the same interposer in one implementation).

In a further aspect, a single-chip solution with memory/storage residing on the same chip is disclosed.

In another aspect, a multi-chip, single package solution with memory/storage residing on the same chip or on one or more adjacent pieces of silicon.

These and other aspects shall become apparent when considered in light of the disclosure provided herein.

BRIEF DESCRIPTION OF THE DRAWINGS

FIG. 2A is block diagram of a conventional camera system that includes camera integrated with an ISP.

FIG. 2B is a flow diagram of a method of processing image sensor data using the camera system of FIG. 2A.

Figures 1A, 1B:
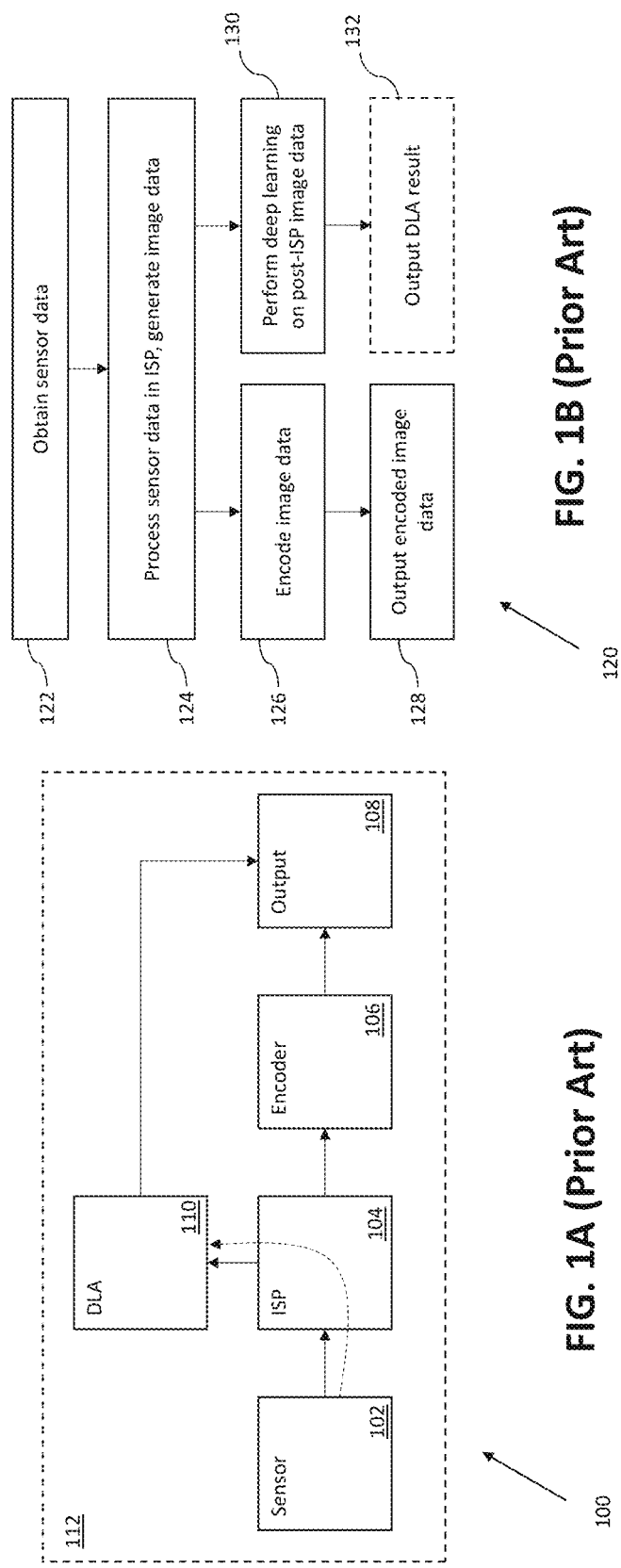
FIG. 1A is block diagram of a conventional camera apparatus that includes a deep learning accelerator (DLA) and an image signal processor (ISP).
FIG. 1B is a flow diagram of a method of processing image sensor data using the camera apparatus of FIG. 1A.

All figures © Copyright 2018-2020 Micron Technology, Inc. All rights reserved.

DETAILED DESCRIPTION

Reference is now made to the drawings wherein like numerals refer to like parts throughout.

As used herein, the term "computer program" or "software" is meant to include any sequence of human or machine cognizable steps which perform a function. Such program may be rendered in virtually any programming language or environment including, for example, C/C++, Fortran, COBOL, PASCAL, Python, Ruby, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like, and may also include scripts, including without limitation those written in scripting languages.

As used herein, the terms "memory" or "memory device" may include any type of integrated circuit or other storage device adapted for storing digital data including, without limitation, ROM, PROM, EEPROM, DRAM, SDRAM, DDR/2/3/4/5/6 SDRAM, GDDRx, EDO/FPMS, FeRAM, ReRAM, RLDRAM, SRAM, "flash" memory (e.g., NAND/NOR), 3D memory, HBM/HBM2, and PSRAM.

As used herein, the terms "microprocessor", "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, graphics processors (GPUs), secure microprocessors (SMs), and application-specific integrated circuits (ASICs). Such digital processors may be contained on a single unitary IC die, or distributed across multiple components.

As used herein, the terms "light sensor", "photosensor", "photosensor element", or "photodetector" are generally meant to include individual light sensing elements that are capable of sensing an amount of light incident at a single location (i.e., at a single sensor pixel) and translating the information into a current/voltage. One light sensor generally includes one p-n junction area configured for photon detection.

As used herein, the terms "imager", "camera imager", "image sensor", "image detector" or "camera sensor" are generally meant to include the part of a camera apparatus that can detect and convey information that can be used to generate an image. And image sensor generally includes at least one array of photosensors and accompanying filters/lenses.

As used herein, the terms "sensor data", "sensed data", "unprocessed sensor data", or "direct sensor data" are generally meant to include unprocessed data/information obtained directly from the photosensors of an imager. The sensor data corresponds to amounts of light detected by individual photosensors at their individual locations. Raw format image data and pre-raw sensor data.

As used herein, the term "unprocessed data" refers without limitation to data which has been wholly unprocessed, or which may have been "lightly" processed or pre-processed such that one or more characteristics of the data are retained (e.g., which has not experienced any significant degree of data loss or addition of ancillary or enhancement data).

Overview

In one exemplary aspect, the present disclosure provides improved methods and apparatus for processing and evaluating sensor data. Specifically, the present disclosure includes methods and apparatus for applying data analytics such as machine learning algorithms directly to unprocessed sensor data so as to, inter alia, enhance operation of the analytics, and/or provide other benefits such as reduced processing overhead.

In one exemplary embodiment, an electronic apparatus such as a camera apparatus configured according to the disclosure advantageously bypasses conventional image signal processing (ISP) so as to enable provision of sensor data directly to a deep learning accelerator (DLA) device resident on the camera apparatus. The DLA device may be configured to perform (or aid performance of by another device) any number of deep learning/machine learning tasks such as object/face detection, object/face identification or recognition, motion detection, motion identification, or object counting.

Providing sensor data directly to the DLA, as opposed to using ISP to process the sensor data first, in many instances allows the camera apparatus to: (i) obtain deep learning results more quickly by (at least initially) bypassing the ISP and any latency associated therewith, (ii) perform deep learning tasks more effectively by at least providing the DLA more relevant data than would be provided post-ISP, and (iii) save processing overhead and/or battery power by activating certain camera functions only when necessary (as decided at least partially by the DLA).

The camera apparatus of the present disclosure may in other embodiments include a specialized image sensor, such as one configured to: (i) generate data that is particularly useful to analytics such as deep learning processes, and/or (ii) not generate data (or reduce generation of data) that is particularly useful for conventional image signal processing and display but not analytics.

Finally, providing image sensor data initially to a DLA (and selectively to an ISP) allows for the device to selectively generate image files. In particular, a camera apparatus can (i) perform a quick deep learning evaluation of sensor data to determine, for example, whether a recorded scene includes something relevant and (i) based on the DLA determination, activate or not activate various functions related to generating an image for display. Functions related to generating an image for display might include ISP, encoding, and activating of an additional image sensor or image sensor mode. Selective activation of the image generation functions might allow a camera apparatus to at least conserve battery power.

Other features and advantages of the present disclosure will immediately be recognized by persons of ordinary skill in the art with reference to the attached drawings and detailed description of exemplary embodiments as given below.

Detailed Description of Exemplary Embodiments

Exemplary embodiments of the apparatus and methods of the present disclosure are now described in detail. While these exemplary embodiments are primarily described in the context of machine or deep learning, the general principles and advantages of the disclosure may be extended to other types of machine learning and artificial intelligence algorithms, and in fact more generally to other types of computerized analytics processes.

It will be further appreciated that while exemplary embodiments of the disclosure are described primarily in the context of image capture or processing devices such as digital cameras, the various features and functions described herein are equally applicable to other types of sensor paradigms, such as for instance acoustic data analysis such as may be used in high-resolution Doppler sonar systems (e.g., for underwater object detection or imaging, or characterization of current profiles or flows), as well as radar, laser, or other comparable systems based on non-visible spectrum electromagnetic radiation analysis.

Other features and advantages of the present disclosure will immediately be recognized by persons of ordinary skill in the art with reference to the attached drawings and detailed description of exemplary embodiments as given below.

Exemplary Image Systems and Methods of Operation

Figure 3:
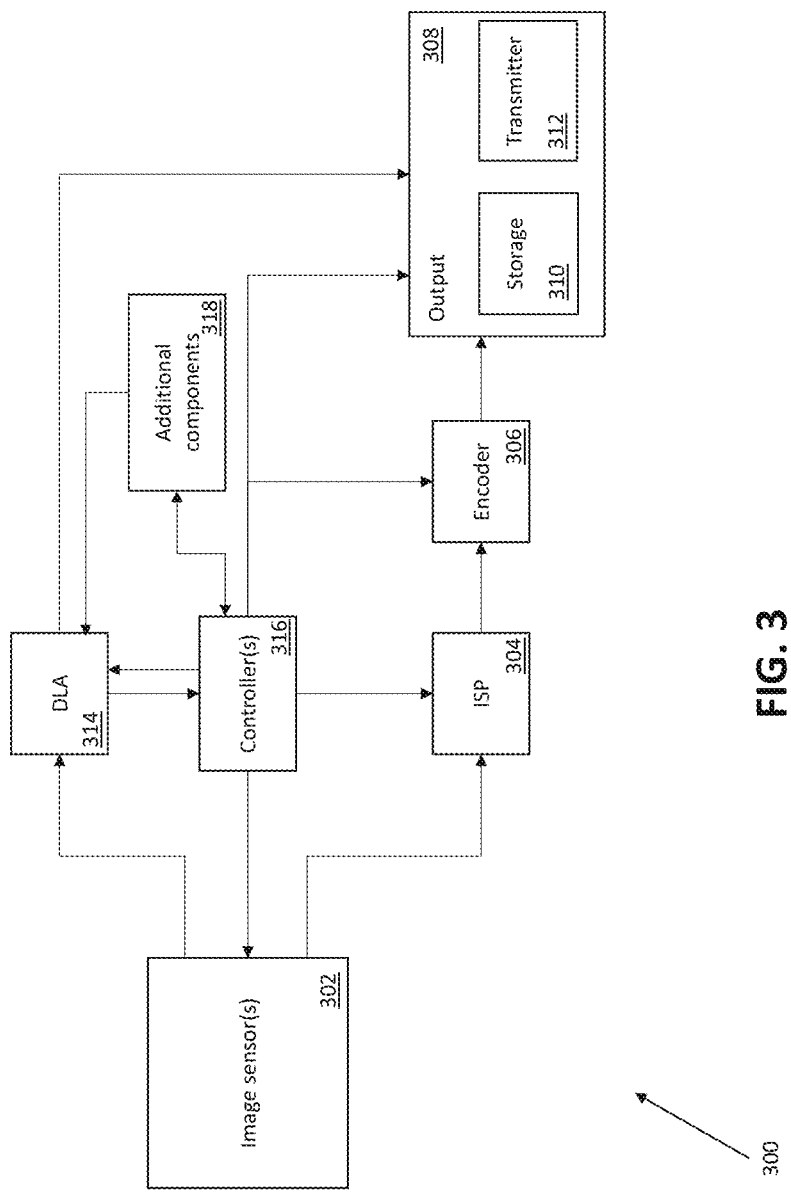
FIG. 3 is a functional block diagram of one embodiment of a camera apparatus according to aspects of the present disclosure.

FIG. 3 is a logical block diagram of an exemplary imaging (e.g., camera) apparatus 300 having at least one image sensor 302 connected directly to a deep learning accelerator (DLA) apparatus, such as an integrated circuit or "chip" 314. As described in greater detail below, FIG. 3 illustrates an exemplary embodiment of a camera apparatus 300 that includes logical/signal interconnections between DLA, ISP, and various other camera components. However, simpler versions of the camera apparatus are contemplated also in the present disclosure (see e.g., the simplified embodiment of FIG. 4).

In one configuration, the camera apparatus 300 of FIG. 3 also includes an ISP 304, an encoder 306, a data output module 308, one or more controller(s) 316, and additional (non-imager) host device components 318.

In one embodiment, the image sensor(s) 302 is in data communication with the DLA 314 and the ISP 304 and is configured to provide sensor data directly to the DLA 314 and the ISP 304. In one variant, the sensor data may be provided to the DLA and ISP simultaneously and in parallel. In another variant, the image sensor(s) may be configured to: (i) automatically provide sensor data directly to the DLA, and (ii) to provide sensor data to the ISP only in response to an instruction from a controller(s) 316.

As a brief aside, regarding the data received by a DLA, it will be recognized that an image sensor might capture a greater range of light colors/wavelengths, or detect smaller differences in amounts of light for given sensors, than are useful or necessary for generating an image. Conventional ISP often removes or transforms sensor data until only acceptable values of only acceptable colors are left (e.g., whole number RGB values in a range of 0-255). As such, some of the data captured by the sensor(s) is truncated, filtered, or eliminated, thereby in effect losing information or "richness" associated with the raw or lightly processed data.

In addition, as previously discussed, image signal processing transforms sensor data such that a resulting image/video is pleasing to the human eye. This process (i) removes/transforms some of the original sensor data, and (ii) does not add new information about the scene being captured by the camera image sensor (rather, in the case of e.g., green wavelength data, it often merely increases the weighting or multiplicity of the same data). In that deep learning algorithms and other types of analytics typically work more effectively if they are given more relevant data (i.e., data relating to the actual scene captured by a camera imager, versus that which has been manipulated in one form or another), allowing a DLA to evaluate all of the sensed data originally captured by a camera sensor (including that which was "out of bounds" for the ISP) advantageously can lead to an improved deep learning result as compared to one based on post-ISP data.

Returning again to FIG. 3, the data provided to each entity is in one implementation effectively identical; however, it will be appreciated that the data sets provided to the DLA versus the ISP may be heterogeneous in nature, such as for example where some of the data provided to one process or device is a subset of the data provided to the other. There may be applications or operations where, for instance, certain data required by the ISP for processing of the "raw" sensor data is not required for the DLA to operate optimally. As such, the level of pre-ISP processing (if any) may be heterogeneous between the DLA and ISP branches as well.

Moreover, formatting of the data provided to each device may be identical or selectively differentiated. As previously discussed, DLA logic or algorithms may in some instances be insensitive to formatting of the data, whereas the ISP may not (and may for example require that the data be provided to the ISP in prescribed format or temporal relationship/order).

In one embodiment, the image sensor(s) 302 comprise a single image sensor that is configured to provide identical sensor data to the DLA and the ISP. In another embodiment, the single image sensor may be configured to operate in multiple image sensor modes, and the camera apparatus 300 is configured to use a first image sensor mode to generate sensor data for the ISP 304, and use a second image sensor mode to generate sensor data for the DLA 314. This may be done for example in a batched or interleaved process, or even simultaneously where the supporting circuitry is configured to process the data from the two modes in parallel.

In yet another embodiment, multiple image sensors are used in the camera apparatus 300, wherein a first image sensor is configured to generate sensor data for the ISP 304, and a second image sensor is configured to generate sensor data for the DLA 314.

Examples of different image sensors and image sensor configurations useful with the various embodiments of the apparatus are described elsewhere in the present disclosure, with respect to FIGS. 15A-15C and 16A-16E.

In one embodiment, the DLA 314 is configured to perform one or more deep learning tasks, such as to detect, recognize, and/or recognize faces, objects, creatures, types of motion, types of behavior, etc. In other embodiments, the deep learning algorithm(s) are configured to perform other types of machine learning tasks. The DLA 314 is configured to use sensor data (raw format image data or pre-raw image data) provided directly by the image sensor(s) 302 to perform one or more of its deep learning tasks. In other words, the DLA includes deep learning architecture configured to accept sensor data (i.e., photosensor values associated with a scene captured by the image sensor(s) 302) and, based on the sensor data, generate one or more results/conclusions.

It will be appreciated that the utilization of the DLA/algorithms may occur in parallel or in sequence, as iterations of logical loops, etc., so as to most effectively utilize the DLA assets. For example, the DLA may be comprised of multiple individual processor cores (or groups of cores, including for example GPUs which are highly optimized for conducting multiple different SIMT/SIMD operations on input data) operating on logical/instruction threads in parallel. Conversely, output from one thread or process may be required as an input to another. Moreover, different types of processes (e.g., performing heterogeneous types of DL or ML algorithms) can be run in parallel or serial as applicable to the given application.

As one example, for a deep learning algorithm performing a face detection/identification task, the result might be one of: 1) a face has been detected; 2) a face has been detected but not recognized; 3) a face has been detected and identified as person A; 4) a human has been detected, but their face is not visible; 5) a face has been detected but there is not enough data to perform an identification; or 6) no face or person has been detected, etc. In one implementation, the DLA results data also includes a level of confidence of a particular conclusion (e.g., based on heuristic or fuzzy logic variables, or other schemes), such that the result might indicate e.g., that a face has been detected and recognized as person A, but with a "low" (of possible low/medium/high) level confidence. In one implementation, the DLA result also includes an identification of individual photosensors or sets/arrays of photosensors of the image sensor(s) 302 as having provided important information. For example, the DLA result may identify photosensors that have captured data corresponding the area of the scene corresponding in which a face is located. This information may be utilized both for subsequent processing by the DLA or follow-on processes (such as for further identification refinement, and also as input to the image sensor branch (e.g., ISP), such as for a "hint" as to where image processing should be focused or even image cropping type functionality. For instance, the aforementioned "green" enhancement may only be applied to the region of interest (ROI), as may other types of operations (or conversely operations obviated or avoided for the ROI).

In another example, for a deep learning algorithm performing a suspicious behavior detection task, the DLA result might simply be binary; e.g.: 1) suspicious behavior has been detected, or 2) suspicious behavior has not been detected. As with the previous example, the DLA might also identify a level of confidence and/or particular photosensors.

In another example, a deep learning algorithm performing an animal/object recognition task, the DLA result might include: a determination that creature A has been found or not found, a level of confidence for the results, and/or potentially, an identification of relevant photosensors.

Various other deep learning tasks might be implemented on a DLA 314, depending on the specific application of the camera apparatus 300.

Furthermore, the DLA 314 might use more than just the sensor data provided by the image sensor(s) 302 to perform one or more of its deep learning-based tasks. For instance, in some variants, external data such as from camera sensors or other components 318, or from an outside source, may be used in aiding the DLA/analytics processing. One such example is a reference library or templates of objects, faces, etc. from which the DLA can "learn" the types of objects and characteristics which it is to use as a basis for detection/recognition. For instance, the DLA could learn whether a person is wearing a facemask, glasses or other type of facial apparatus, or a hat. Such template or library data may be disposed e.g., on a cloud process with which the camera or device 300 is in data communication, or alternatively such data may even be stored locally assuming a suitably sized storage apparatus.

In various embodiments of the present disclosure, the DLA 314 is also configured to use additional data such as information on time, location, temperature, pressure. In one implementation, the additional data include sensor or image data previously stored or currently provided to the camera apparatus 300. For example, a facial identification task requires at least a database of identified faces that the DLA 314 can use for comparison. The additional data may be provided to the DLA from one or more of the additional components 318 of the camera (described below).

In one aspect of the disclosure, the camera apparatus 300 includes one or more additional camera components 318. The additional components 318 may include for example one or more of: non-imager sensors, wireless receiver(s), storage devices, a clock/calendar, a GPS tracker, accelerometer, and a flash/illumination apparatus. In one variant, the non-imager sensors include one or more of: a temperature sensor, a humidity sensor, a pressure sensor, and a microphone.

In some embodiments, one or more of the additional components 318 are configured to provide data to the DLA 314. The additional components 318 may also be configured to provide data/instructions to one or more camera controller(s) 316 (described below). The DLA 314 and/or controller(s) 316 are then configured to process the additional data/instructions.

In some configurations, the DLA 314 is configured to use data from the image sensor(s) in combination with at least some of the additional data to perform at least some of its functions. For example, in one implementation, a DLA 314 of a stationary camera apparatus 300 may be configured to detect suspicious behavior using image sensor data in conjunction with current time information. A deep learning architecture system that has been trained to identify suspicious activity using both sensor and time information might be able to differentiate similar behavior as suspicious or not suspicious depending on time of day, day of the week (or using some other time-dependent pattern recognized by the DLA during training). In another implementation, a DLA 314 of a non-stationary camera apparatus 300 may be configured to detect suspicious behavior using image sensor data in conjunction with current time and current location information.

In another example, seismic activity can be detected by the DLA based on e.g., S and/or P-wave data obtained from external seismic sensors operated by e.g., USGS, which can be correlated in time with events identified via the camera apparatus by the DLA (e.g., a bookcase shaking in a monitored office building can be correlated to an S or P-wave transient from a local earthquake).

In another example, a DLA 314 of a remote wildlife camera may be configured to detect a number of animals based on (i) image sensor data, (ii) current time, location, and temperature information, and (iii) a database of image or sensor files corresponding to the animals. Infrared sensor data (where available) may also be useful in confirming detection or serving as an input to the DLA process. A deep learning system that has been trained using all of the above information might learn to recognize that a certain animal is more likely to be detected at certain combinations of time, location, and temperature, and confirm its presence via an IR image (the latter which may for example be generated via the ISP processing chain of the device in parallel with DLA analysis).

In another implementation, the DLA 314 of a remote wildlife camera may be configured to detect particular animals based on (i) image sensor data, (ii) a database of sensor data files, and (iii) sounds picked up by a camera microphone.

In one embodiment, the controller(s) 316 of the camera apparatus 300 include logic for activating/deactivating and/or modifying one or more of the camera functions based on data or instructions from the additional camera components 318. For example, the camera apparatus 300 may be configured to collect image sensor data only at certain times of day. In another example, the camera apparatus 300 may be configured to transmit data only on a certain day of the month. In another example, a transmitter 312 may be configured to use a particular frequency channel depending on a time of day and current atmospheric conditions. Various other camera configurations are described further below.

In one aspect of the disclosure, the ISP 304 is configured to process sensor data using conventional ISP functions. In one embodiment, the ISP 304 includes one or more of demosaicing (e.g., interpolation of RGB values for each pixel), color space translation, color balance, gamma correction, optical/lens correction, sharpening, and noise reduction. In one variant, some or all of the ISP functions can be activated or modified by the controller(s) 316. For example, the controller(s) 316 may activate/modify the ISP 304 at least partially based on DLA results or output from certain intermediary stages of DLA processing. In one implementation, the controller(s) 316 activate/modify the ISP 304 at least partially based on additional data obtained from one or more of the additional components 318.

In one embodiment, the encoder 306 is configured to encode/compress image data provided by the ISP 304 and output an image or video file that has been encoded in a known format (e.g., MPEG, JPEG, AVC, HEVC). In one variant, at least a portion of the encoding process may be activated or modified by the controller(s) 316. For example, the controller(s) 316 may activate/modify the encoder base at least partially on DLA results and/or additional data obtained from other onboard or external sources.

In one embodiment, the camera apparatus 300 includes a data output module 308, where data collected/generated by the camera apparatus 300 can be stored and/or transmitted. The output module 318 includes at least one storage unit 310 (e.g., flash memory, removable storage card, etc.) and at least one transmitter 312. It should be noted that although the storage 310 and transmitter 312 logically grouped together in FIG. 3, they are not necessarily physically located within the same camera component, or logically coupled to one another. In one embodiment, the at least transmitter 312 includes a baseband unit and an antenna. In one embodiment, the transmitter 312 is part of a transmitter/receiver unit such as a wireless PAN (e.g., IEEE Std. 802.15.4, BLE, etc.) or WLAN interface. Alternatively, the wireless interface may be a 3GPP-compliant 4G/4.5G/5G interface, such as one using licensed or unlicensed spectrum (e.g., NR-U).

In one aspect of the disclosure, the one or more controller(s) 316 are able to configure/activate one or more of: the image sensor(s) 302, the ISP 304, the encoder 306, the output module 308, the DLA 314, and the additional components 318 of the camera apparatus.

The camera controller(s) 316 may in some embodiments also include logic for configuring different parts of the camera apparatus 300 based on results provided by the DLA 314. For instance, in one embodiment, a first DLA result can lead to the controller(s) 316 issuing commands to activate or keep active a particular camera function (e.g., activate the ISP 304 or encoder 306), and a second DLA result can lead the controllers 316 to deactivate or keep deactivated a particular camera function. The controller(s) 316 may also be configured to transfer data (directly or modified) from the DLA 314 to one of the other camera components, such as storage, additional dedicated processors, or other functional units such as the wireless interface.

Figure 6:
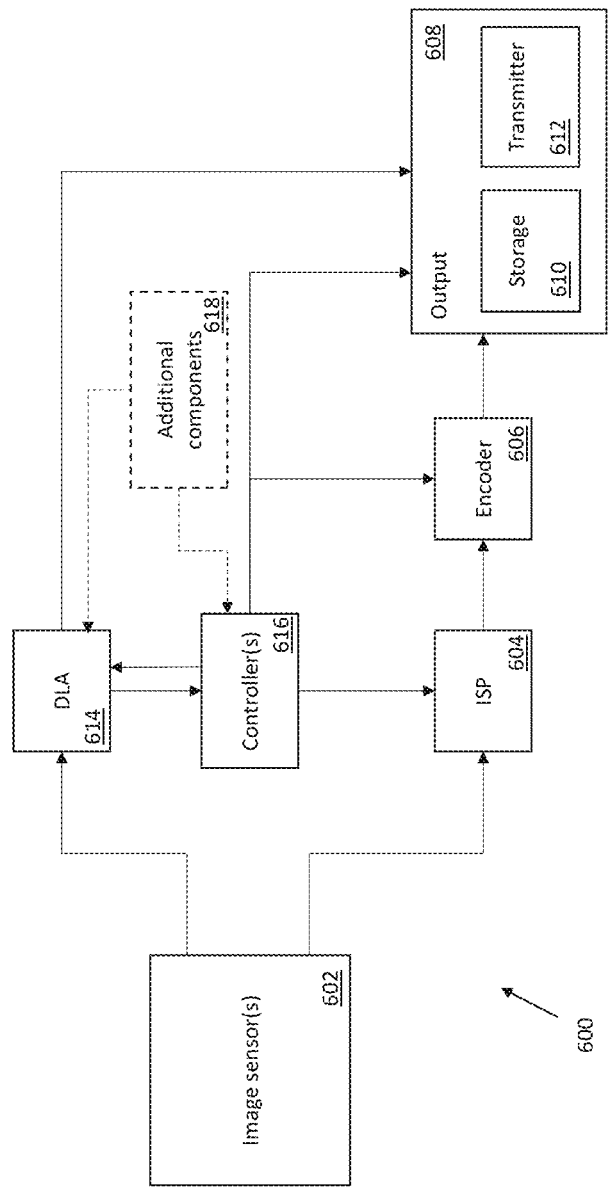
FIG. 6 is a functional block diagram of another exemplary embodiment of a camera apparatus in accordance with aspects of the present disclosure.
Figure 7:
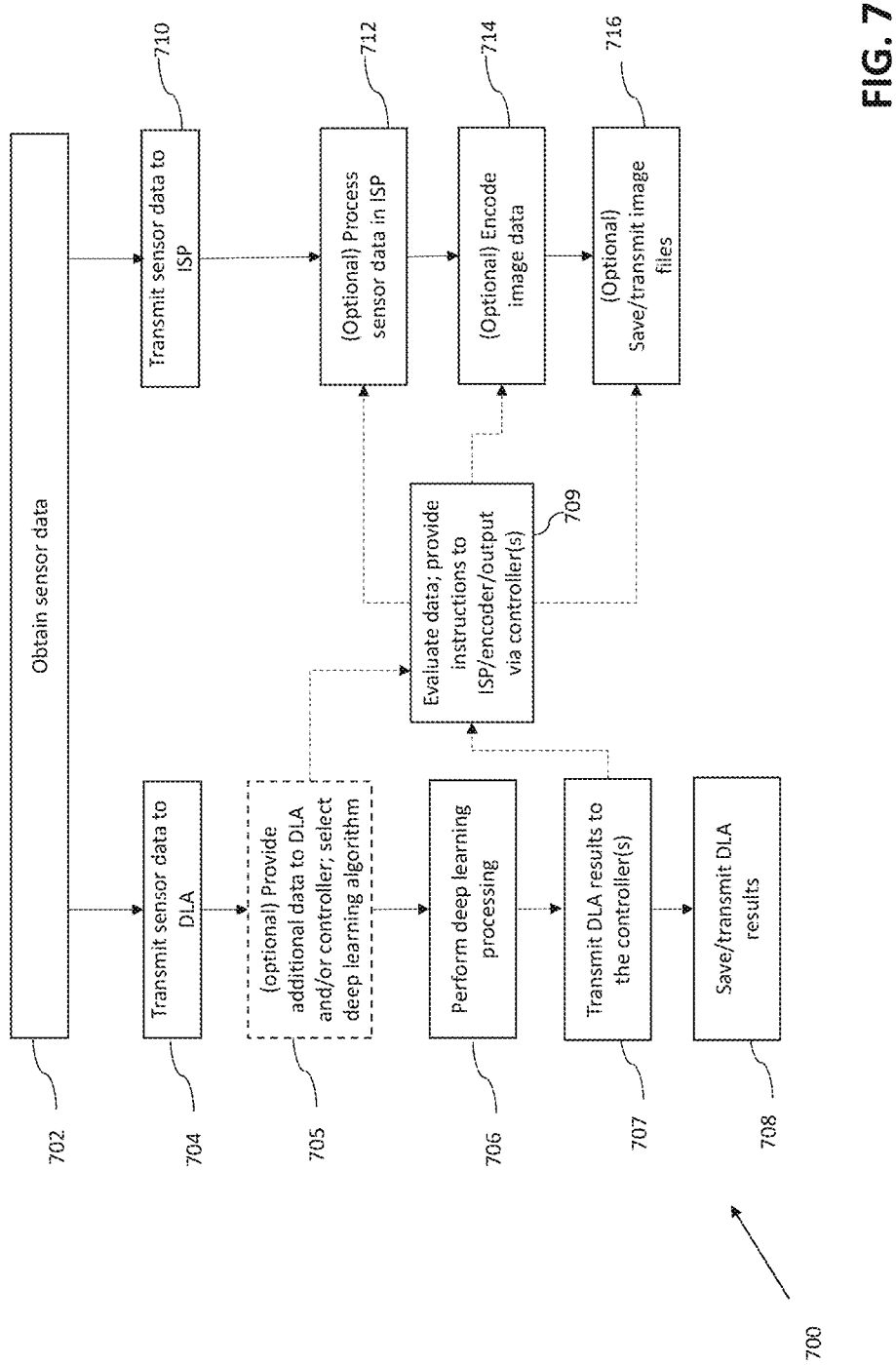
FIG. 7 is flow diagram of a method of processing image sensor data using the camera apparatus of FIG. 6.

Further examples of the controller(s) 316 configuring ISP 304, Encoder 306, and Output 308 modules based on DLA results are provided in the description of FIGS. 6 and 7.

In one embodiment, the one or more controller(s) 316 can power the image sensor(s) 302 on or off based on DLA results. In some configurations, the camera apparatus 300 includes two or more image sensors 302, and the controllers 316 can selectively power on/off the individual image sensors based on DLA results or output.

Moreover, in some embodiments, the controllers 316 can configure the image sensor(s) 302 to function in a particular mode. For instance, the image sensor(s) 302 can be operated in a low-power mode, a high-power mode, a low gain/exposure mode, a high gain/exposure mode, etc.

In some variants, the image sensor(s) 302 can be configured to function with particular sets of active photosensors based on e.g., controller input. In one such embodiment, the controller(s) 316 instruct at least one of the image sensor(s) 302 to transmit or not transmit sensor data to the camera ISP chip 304. Further examples of the controller(s) 316 configuring image sensor(s) 302 based on DLA results are provided in the description of FIGS. 11 and 12.

It will be appreciated that the logic embodied in any of the DLA, ISP or encoder functionality of FIG. 3 (and in fact subsequent embodiments herein) may be implemented in hardware, software, or combinations thereof. For instance, reprogrammable logic such as an FPGA may be used to implement DLA functions, or ISP functions at the direction of the DLA. Alternatively, high-speed hardware logic (e.g., via an ASIC) can be used to implement the foregoing functionality, at cost of limited/no re-programmability or reconfiguration. Trade-offs between the speed of hardware-based solutions such as ASICs and software-based solutions (e.g., as may be implemented within a processor core operative on an FPGA) may be balanced depending on the requirements of the given application, as will be readily accomplished by those of ordinary sill provided the present disclosure.

Figure 4:
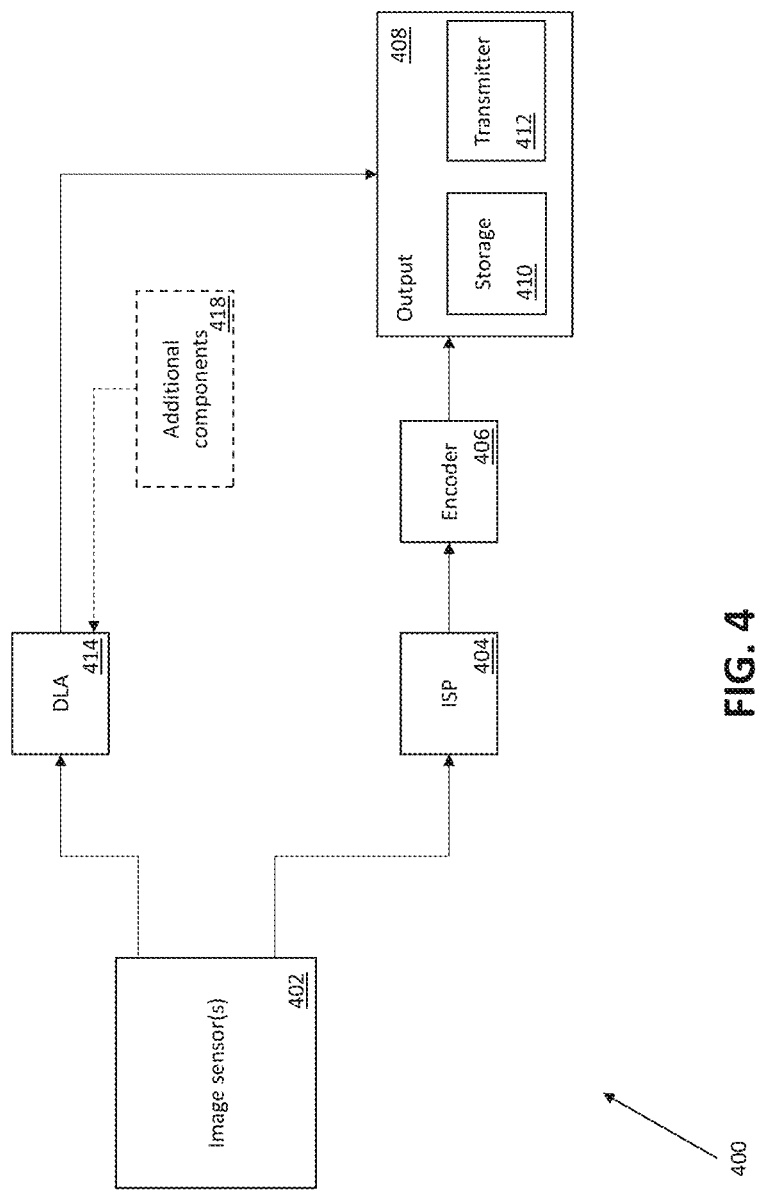
FIG. 4 is a functional block diagram of another exemplary embodiment of another embodiment of a camera apparatus in accordance with aspects of the present disclosure.

FIG. 4 illustrates another exemplary embodiment of the imaging apparatus of the disclosure; i.e., in the form of a simplified camera apparatus 400. The camera 400 includes one or more image sensor(s) 402 directly communicative with the DLA 414 and ISP 404 devices. In one variant, the DLA 414 of the camera apparatus 400 is dependent only on (i.e., processes only) sensor data provided by the image sensor(s) 402. In another variant, the processing by the DLA 414 depends on the data of the image sensor(s) 402 as well as additional data provided by additional camera components 418, discussed in greater detail below. Moreover, none of the camera function in the simplified camera apparatus 400 of FIG. 4 depends on the results or output of the DLA 414. Rather, the camera is configured to separately generate image/video data and deep learning evaluation results, and output both (e.g., saved and/or transmitted, or submitted to another module or process for further processing).

Figure 5:
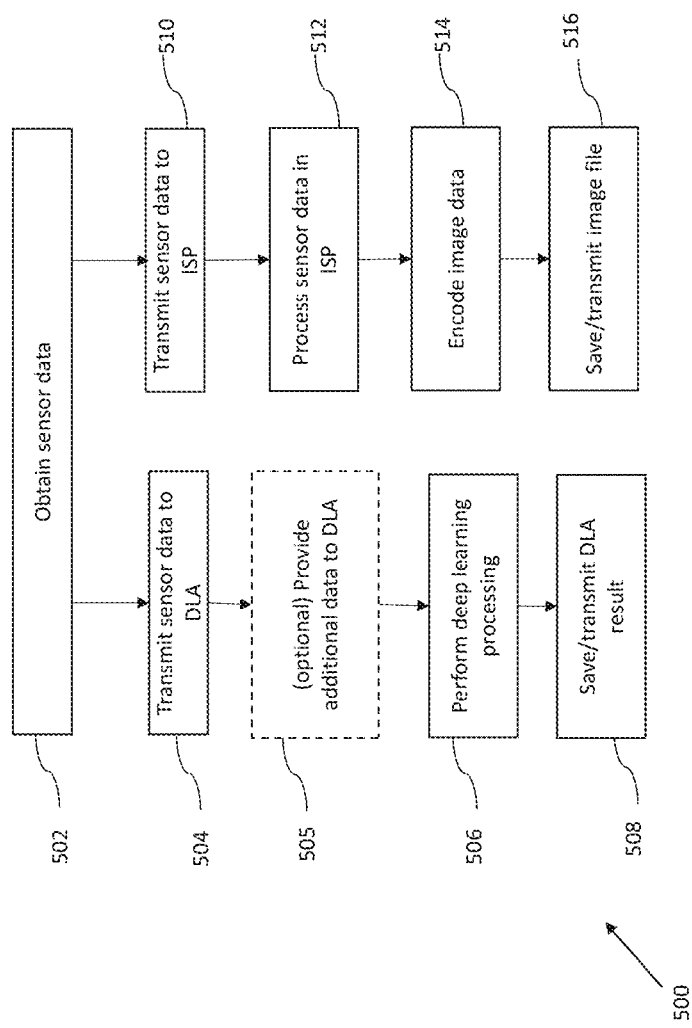
FIG. 5 is flow diagram of a method of processing image sensor data using the camera apparatus of e.g., FIG. 3 or 4.

FIG. 5 is a logical flow chart illustrating one embodiment of a method 500 which may be performed by the camera 400 in FIG. 4.

Specifically, at step 502, the image sensor(s) 402 generate sensor data. The image sensor(s) 402 may include a single image sensor that provides identical data to the DLA 414 and ISP 404. In another variant, the image sensor(s) 402 include two different image sensors connected to the DLA 414 and ISP 404, respectively. In yet another variant, the sensor(s) may output identical data, with only a subset of the output provided to one of the DLA or ISP, while the other (e.g., ISP) receives the full complement of output data.

In one embodiment, the sensor data includes: (i) digital values associated with or derived from individual photosensors in the photosensor array of the image sensor, and (ii) optionally, location data relating to each of the individual photosensors on a photosensor array. The digital values correspond in one implementation to the amount of light detected at the individual photosensor element (e.g., an intensity level). As described previously, color filters over individual photosensor elements can allow light only in predetermined wavelength ranges to interact with their photosensor elements, and as such varying intensities at varying wavelengths will occur across the array.

In steps 504 and 510, the image sensor(s) 402 provide sensor data to the DLA 414 and ISP 404. In one implementation of the simplified camera apparatus 400, the image sensor(s) 402 are configured to automatically transmit the sensor data they collect/generate directly to the DLA 414 and ISP 404, without waiting for a specific prompt or instruction, thereby reducing the complexity of the device.

In one embodiment (e.g., as an optional step 505 of the method 500), additional, non-imager sensor data is provided to the DLA 414 from one or more optional non-imager camera components 418. In one variant, the additional data includes one or more of: (i) location information (e.g., GPS location of the camera apparatus generated by a GPS receiver or similar positioning device); (ii) a then-current time value or stamp; (iii) a then-current ambient temperature; (iv) data from an indigenous accelerometer, and/or (v) reference sensor data (e.g., data specifically identifying the sensor(s) from which the data was generated. In one implementation, at least some of the additional data is generated and/or otherwise obtained by the camera. For instance, some of the data may be locally generated, while other of the data is received by the camera apparatus 400 from an entity or process outside the camera (e.g., via a wireless interface of the camera). For instance, the additional/supplemental data may include time-stamped non-imager sensor data acquired by one or more non-imaging sensors of the camera apparatus 400 or received from a source outside of the camera apparatus.

In one implementation, the reference sensor data is data previously collected by the image sensor(s) 402. In another implementation, the reference sensor data is data previously or currently collected by a different image sensor (e.g., one external to the camera apparatus 400).

It will be appreciated that providing additional data to the DLA (step 505) may be performed before, after, and/or simultaneously with providing sensor data to the DLA (step 504). In another embodiment, no additional data is provided to the DLA 414, so that the deep learning process is performed entirely using image sensor 402 data.

In steps 506 and 512, the sensor data is independently processed by the DLA 414 and the ISP 404. Steps 506 and 512 of the method 500A are completely independent of each other.

In step 506, the DLA 414 inputs the sensor data and, optionally, some of the additional data, into a deep learning system in order to perform at least one deep learning task.

In one embodiment, the deep learning algorithm(s) is/are configured to perform facial recognition. The algorithm might include (i) a facial detection portion performed using only the sensor data, and (ii) a facial matching portion performed using the sensor data and additional reference sensor/image data.

In other embodiments, the deep learning algorithm is configured to detect/recognize various other objects. In one variant, the DLA 414 is configured to detect/identify: a human, a crowd of human bodies, an animal/organism, a type of terrain, a street sign, a vehicle, a sports-related object (e.g., ball, puck, goal), a particular movement/action, a sports-related movement (e.g., a throw, a hit), a fire, a celestial object, etc.

In step 510, the ISP 404 performs conventional signal processing on sensor data to produce data that can be translated into an image (e.g., generates RGB or CNYK values for each pixel of a rectangular image). Various ISP functions are described elsewhere in the disclosure.

In step 514, the encoder 406 obtains the image data from the ISP 404 and encodes/compresses it into a recognizable/standardized image or video format (e.g., JPEG, H.264, H.265, etc.).

In steps 508 and 516, the camera apparatus 400 saves and/or transmits the results of the DLA 414 (step 508), and saves and/or transmits the image/video files generated by the ISP 404 and encoder 406 processes (step 516). In one embodiment, the DLA results and image/video files are saved to local camera storage 410 for later processing or transmission. In another embodiment, the DLA results and image/video files may be modulated onto a preselected carrier channel or OFDM waveform and transmitted out of the apparatus 400.

In one variant of the method, DLA results are only selectively stored/transmitted. For example, if the DLA has identified something relevant (e.g., identified a relevant object), this result can be stored and/or transmitted by the camera 400. However, if the DLA has not found anything relevant in a particular set of sensor data, the "nothing" result is discarded or not saved. As such, storage space/processing can be conserved, since only relevant output is stored/transmitted or additionally processed.

In one embodiment, steps 508 and 516 are performed independently, potentially, at different times.

In another embodiment, image/video files and the DLA results that are generated from the same sensor data (or from sensor data taken at the same time) are associated together, and then saved/transmitted together. DLA results and image files can both include timestamps that are used to create the association. In one variant, DLA results are appended to image/video files as metadata. For example, a DLA-generated label indicating that an object of relevance is present may be added to a set of video frames. Thus, when a continuous video stream is saved/transmitted, portions of the video stream might include a "relevant" label.

FIG. 6 is a logical block diagram of a camera apparatus 600 with image sensor(s) 602 directly connected to the DLA 614 and ISP 604 devices, and controller(s) 616. The controller(s) 616 of the camera apparatus 600 are able to configure/affect the DLA 614, ISP 604, encoder 606, and output 608 functions based on results from the DLA 614 and/or data from additional camera components 618.

FIG. 7 is a logical flow chart of a method 700 which may be performed by the apparatus 300 of FIG. 3 and camera 600 in FIG. 6.

The camera 600 and method 700 of FIGS. 6 and 7 are generally similar to the camera 400 and method 500 of FIGS. 4 and 5, with the addition of one or more controller(s) 616 that may modify the ISP, encoder, and/or outlook processes, whether based on local logic or received commands or data from an external process such as via a wireless link of the camera 600.

In one embodiment, steps 702, 704, 708, and 710 of the method 700 in FIG. 7 are performed generally in the same manner as in the method 500 in FIG. 5.

In step 705 of the method 700, the data from additional camera components 618 (additional data) is provided to both the DLA 614 and the controller(s) 616.

Optionally, as shown in step 705, the controller(s) 616 may configure the DLA 614 based on the additional data, that is, the controller(s) 616 may be used to select and activate one or more deep learning algorithm of the DLA 614 from a set of pre-trained DLA algorithms.

For example, the camera 600 may be part of a security system configured to (i) perform facial recognition and provide access to a premises to authorized personnel on weekdays between 6 AM and 9 PM, and (ii) to take a picture or video of anyone trying to access the premises at other times. The controller(s) 616 may force the DLA 614 to: (i) perform facial detection and facial identification during the specified times and (ii) only perform facial detection during the rest of the time. A method of using the camera 600 in such a security system is described later in the specification with respect to FIG. 8.

In step 706, the camera apparatus 600 performs one or more deep learning tasks using the sensor data and, optionally, the additional data provided by the additional components 618. The deep learning tasks may be set and predetermined for the camera apparatus 600 or may be selected by the controller(s) 616, as described in step 705. The deep learning tasks may also be adaptively modified based on results/analysis to that point in time, and/or external inputs.

In step 707, the results of the deep learning process are provided to the controller(s) 616. These results may be in the form of transmitted data, signals, or other forms.

In step 709, the controller(s) 616 evaluate at least some of the additional data (obtained in step 705) and DLA results (obtained in step 707) using controller logic; based on the evaluation, various functions or components may be configured, activated, or deactivated, such as those of the ISP 604, the encoder 606, and the output module 608. In some embodiments, the controller logic is also updated dynamically based on e.g., prevailing environmental or operational conditions, including based on data received from the additional components 318 or 618 where present).

In optional step 712, sensor data is processed by the ISP 604. In one embodiment, the ISP 604 is activated/turned on by the controller(s) 616 based on DLA results and/or additional data. For example, in one implementation, if the DLA 614 detects an object of relevance (as predetermined by the DLA programmer/manufacturer or other input) using a current set of sensor data, or otherwise labels the current set of sensor data as "important", the controller(s) 616 may activate the ISP 604 so that the camera 600 begins to process the current set of sensor data for storage, display, and consumption. If the DLA 614 does not detect an object of relevance or otherwise decides that a current set of sensor data is not important, the controller(s) 616 may deactivate (or keep deactivated) the ISP 604, in order to conserve processing overhead and/or power. In a different implementation, based on a determination that a current set of sensor data is not important, the controller 616 can activate the ISP, but instruct it to use minimal processing on the current sensor data. Alternatively, the controller can activate certain types of sensors or subsets of photosensors based on classification or detection of certain objects or events by the DLA (e.g., activating IR-band sensor elements when a living object is identified, so as to e.g., enable thermal tracking).

In another variant, the DLA 614 may determine a level of importance (or a predetermined rank) for a current set of sensor data. For example, the DLA 614 may determine that the camera apparatus 600 is observing something that has: (i) high importance, (ii) medium importance, or (iii) low importance. In one implementation, based on the ranking of importance of current sensor data, the controllers 616 may instruct the ISP 604 to (i) activate/not activate; (ii) provide more or less processing; or (iii) provide particular kinds of processing. For example, the most important data may require maximum processing while the least important data may require minimal processing.

In other variants, the DLA may sort current sensor data based on several related or unrelated parameters. For example, the DLA may sort sensor data based on: (i) importance, as determined by the DLA 614 and (ii) a certainty/confidence of the DLA determination. In one implementation, sensor data resulting in a low confidence DLA assessment may be processed such that most of the original data is preserved—so that, for example, a high quality image can be later reproduced/displayed and evaluated by another machine learning process or a human user.

In another variant, the DLA 614 can identify an object of relevance in one or more portions of the captured sensor data corresponding to one or more image areas. In one implementation, the controller(s) 616 can instruct the ISP 604 to only use data provided by individual photosensors that correspond to that area of the image (i.e., to "crop" the data set). In another implementation, the controller(s) 616 can instruct the ISP 604 to apply algorithm(s) that are more power/memory/time intensive to sensor data corresponding to only that area of the image and to apply algorithms(s) that are less demanding of power/memory/time to the rest of the sensor data.

In a further implementation, the controller(s) 616 may instruct the ISP 604 to apply additional or different processing to sensor data corresponding to the relevant area of the image. For example, the controller(s) 616 may force the ISP to perform demosaicing and color space translation to a full data set, but to apply gamma correction and optical correction only to sensor data corresponding to relevant areas of the image. In one embodiment, the DLA additionally generates data/information that is helpful to some functions of the ISP 604. For example, the DLA may find areas that contain contours/edges, which may be helpful to an ISP sharpening function.

In another implementation, the ISP algorithm is a gamma correction algorithm (e.g., expressed as Vout=AVin$\gamma$) and configuring the ISP algorithm comprises setting the gamma value $\gamma$ based on e.g., data or output from the DLA and/or controller(s). The ISP may also configured to perform one or more of operations related to defective pixel removal, color balancing (i.e., white balancing), color space translation, noise reduction, optical correction (e.g., correcting for lens distortion), etc., including selectively based on DLA output and/or controller commands or data.

In optional step 714, image data from the ISP 604 is encoded/compressed by an encoder 606. In one embodiment, the encoder 606 is activated/configured by the controller(s) 616 based on DLA results and/or the additional data.

In one variant, images derived from more important sensor data (as decided by the DLA) are less compressed while images derived from less important sensor data more compressed. In another variant, images with different tiers of importance (as decided by the DLA) are encoded with different encoding standards. For example, images/video that correspond to a recognized/identified face may be encoded with a first standard, images/video that correspond to an unidentified face may be encoded with a second standard, and images/video that correspond to particular behavior are encoded with a third standard. The different encoding standards may depend on, for example, the type of external device (display, storage) that is expected to receive the particular images. In one implementation, the controllers 616 may instruct the encoder 606 to not compress certain image data at all (e.g., if it corresponds to very important information).

In optional step 716, the compressed image/video files are stored and/or transmitted out of the camera apparatus 600. In one embodiment, the storage and/or transmission step is also dependent on the DLA results and/or the additional data.

In one variant, depending on the DLA results, the image file may be stored in a specific type of memory (e.g., permanent, temporary, or having different levels of error or performance levels), stored in particular portions of memory, or not stored in local memory at all. For example, a camera apparatus 600 may be configured to only save images/video corresponding to sensor data that the DLA has identified as having a certain object. In another example, images corresponding to different types of objects may be stored in different portions of memory.

In one variant, DLA results are used to determine the transmission destination for an image (e.g., a particular external device, a server, etc.). For example, the camera apparatus 600 may be configured to (i) send a high priority result (as determined by the DLA 614) to a mobile device (for immediate perusal by a user of the mobile device) and (ii) send a low priority result to a server (for storage). In one variant, additional data is used to determine a manner in which an image file is transmitted (e.g., frequency channel may be chosen based on atmospheric conditions).

In one embodiment, combination(s) of steps 712, 714, and 716 are activated/configured based on the DLA results and/or additional data. In addition, as described with respect to step 516 of the method 500 of FIG. 5, the image/video files may be linked/associated with corresponding DLA results.

Figure 8:
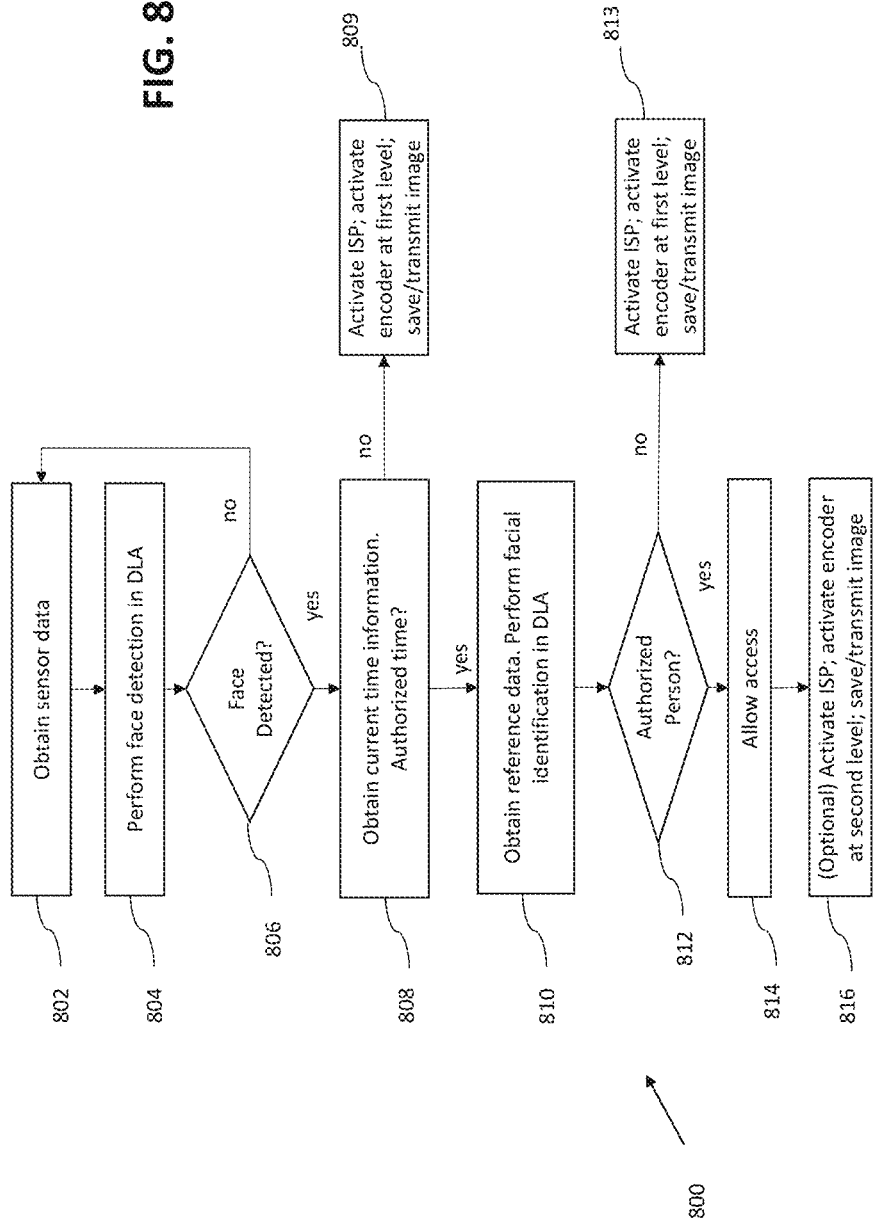
FIG. 8 is a flow diagram of a specific application of the method of FIG. 7.

FIG. 8 is a logical flow chart of one particular implementation of a method of 800 of using camera 600 in a security system of a premises.

In step 802, the camera apparatus 600 obtains sensor data. This corresponds to step 702 in FIG. 7.

In step 804, the DLA 614 uses the sensor data to detect a face.

In step 806, if no face has been detected, the camera 600 continues to obtain data and perform the DLA operation. If a face has been detected, the method moves onto step 808.

In step 808, the camera 600 obtains current time information from additional camera components 618 (i.e., a clock) and uses the controller(s) 616 to determine whether the current time is within the authorized time frame (i.e., weekdays between 6 AM and 9 PM).

If the current time is outside of the authorized time frame, the camera apparatus 600 is configured to obtain an image of the person trying to gain access to the premises at an unauthorized time. In order to do this, in step 809, the controller(s) activate the ISP, encoder, and output components of the camera apparatus 600. In order to obtain an image of a certain quality, the method 800 of FIG. 8 is configured to, for example, minimally compress the image file (i.e., encode at a first level). The camera 600 performs ISP/encoding and then save and/or transmits the image/video files that include the face detected by the DLA (in step 804).

If the current time is within the authorized time frame, the method moves onto step 810. In step 810, the DLA 614 is configured to perform facial identification using sensor data (from image sensor(s) 602) and reference data (from additional components 618). This step corresponds to steps 705 and 706 in the method 700 of FIG. 7.

In step 812, if the DLA 614 does not identify an authorized person, the camera apparatus 600 is configured to obtain an image of the unauthorized person trying to gain access to the premises. In order to do this, the method 800 may perform step 813 in a similar manner to step 809.

In step 812, if the DLA 614 does identify an authorized person, the method moves onto step 814. In step 814, the security system allows the authorized person access to the premises.

Finally, in optional step 816, the security system is configured to obtain an image of the authorized person that gained access to the premises. In the current example, the camera 600 is configured to activate the ISP and encoder in order to generate a compressed image. However, an image of an authorized person might be considered less important, so the encoder in step 816 might be activated at a second level that is more compressive (more lossy) than the first level of encoding.

The method 800 of FIG. 8 illustrates one specific example of using a camera apparatus of the present disclosure where several camera functions (e.g., ISP and encoder) are activated and configured based on results of a deep learning algorithm. One possible advantage of the method 800 is that image generation functions are only used in response to the presence of a person/face and are otherwise deactivated.

Figure 9:
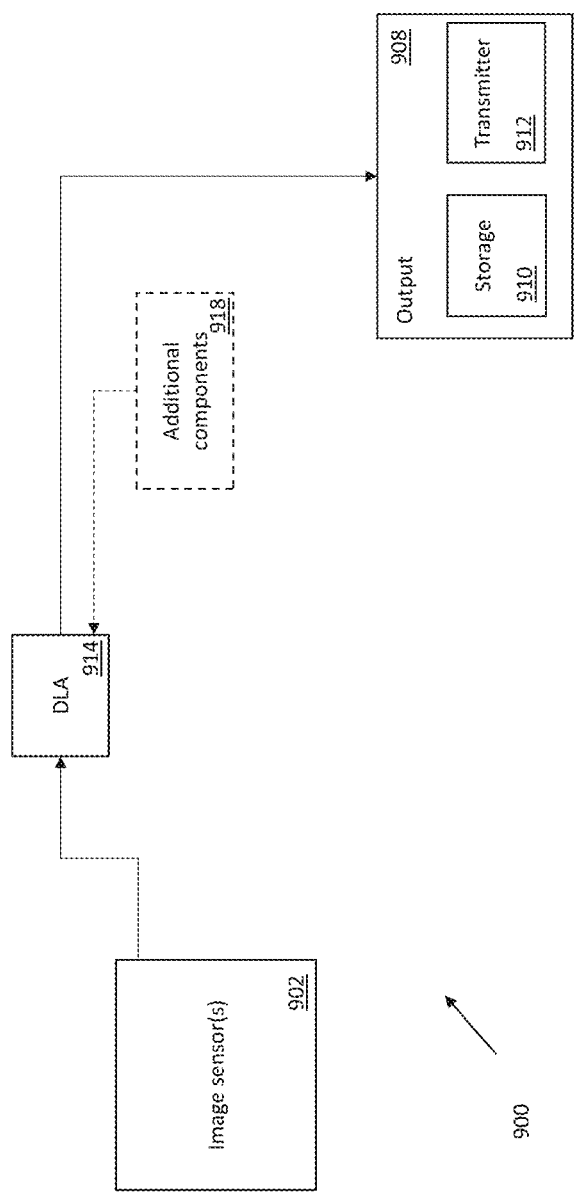
FIG. 9 is a functional block diagram illustrating a further exemplary embodiment of a camera apparatus in accordance with aspects of the present disclosure.

In another aspect of the disclosure, FIG. 9 is a logical block diagram of yet another (simplified) camera apparatus 900 that does not include any ISP. The camera apparatus 900 includes one or more image sensor(s) 902 directly connected to a DLA 914.

In one embodiment, the camera apparatus 900 is not optimized to obtain data that will be used for display/human consumption. In one variant, the image sensor(s) 902 are configured to collect sensor data that is at least partially outside of the visible spectrum and/or at least partially overexposed or underexposed. Examples of image sensors not optimized for display are described with respect to FIGS. 15A-15C and 16A-16E.

Figure 10:
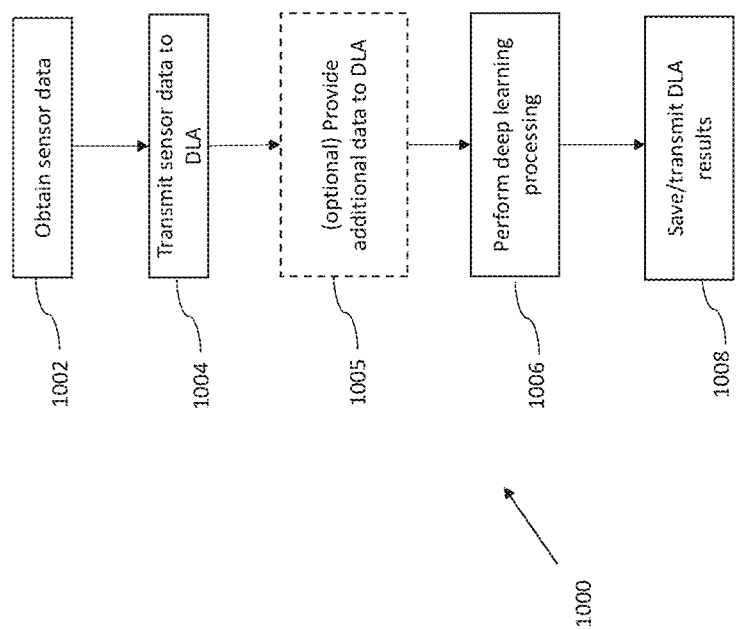
FIG. 10 is flow diagram of a method of processing image sensor data using the camera apparatus of FIG. 9.

FIG. 10 illustrates a flow chart of a method 1000 which may be performed by the camera 900 in FIG. 9. Steps 1002-1008 of the method 1000 in FIG. 10 may be performed generally similarly to steps 502-508 in the method 500 described with respect to FIG. 5.

Figure 11:
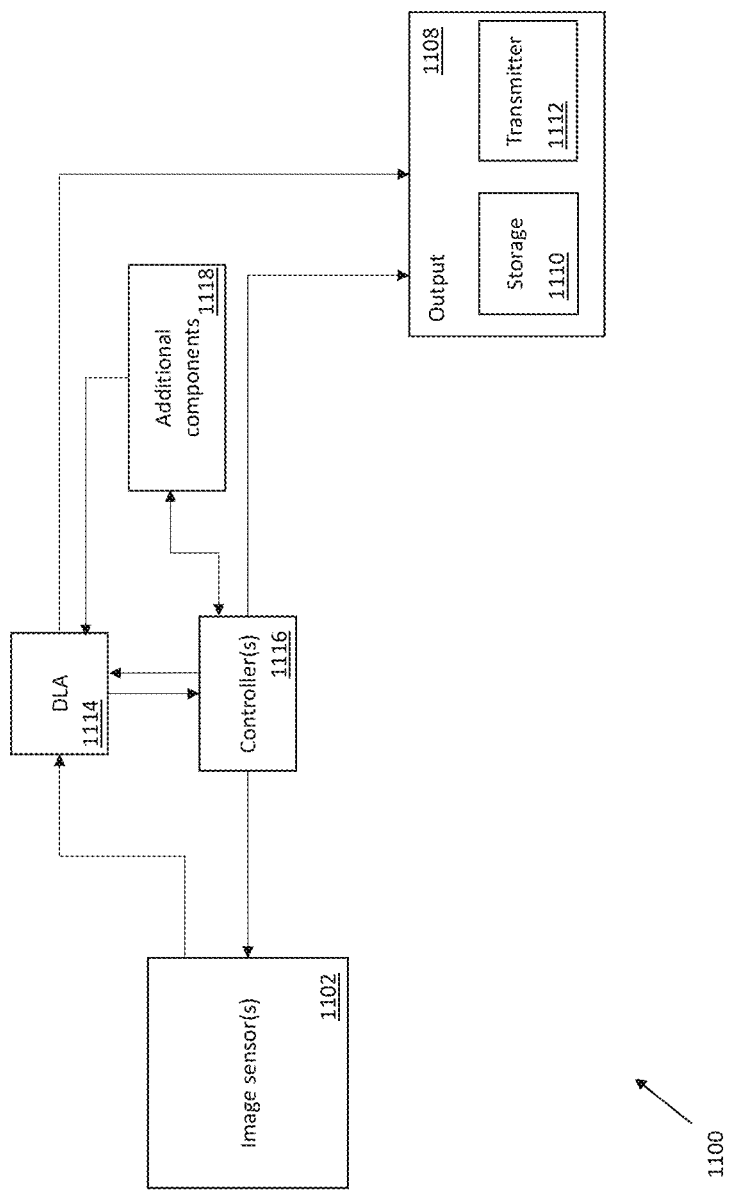
FIG. 11 is a functional block diagram illustrating another exemplary embodiment of a camera apparatus in accordance with aspects of the present disclosure.

FIG. 11 is a logical block diagram of a camera apparatus 1100 that includes one or more image sensor(s) 1102 directly connected to a DLA 1114 and one or more controller(s) 1116 which may be used to configure the image sensor(s) 1102, an output module 1108, and additional camera functions 1118.

Similar to the controller(s) 616 of the camera 600 in FIG. 6, the controller(s) 1116 may configure various camera function, including additional camera components 1118 and output module 1108, based at least in part on results of the DLA 1114 and additional data. Further, in the camera apparatus 1100, the controller(s) 1116 can activate and/or configure the image sensor(s) 1102 based on the DLA results and/or the additional data.

Figure 12:
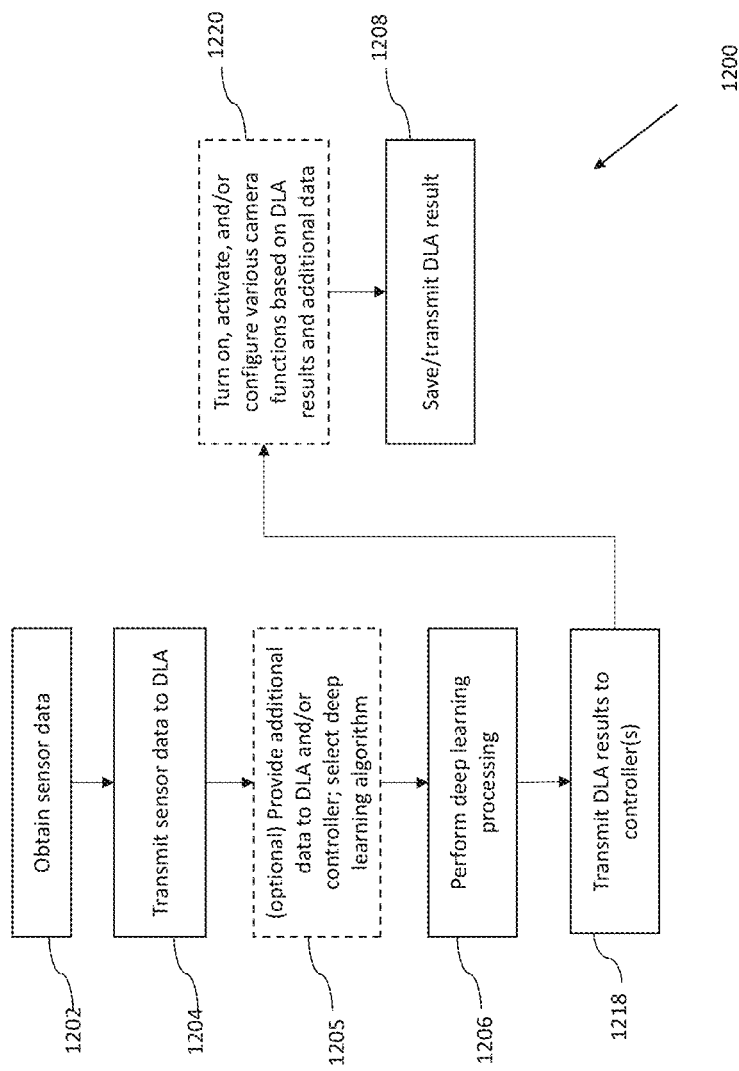
FIG. 12 is flow diagram of a method of processing image sensor data using the camera apparatus of FIG. 11.

FIG. 12 is a logical flow chart of a method 1200 which may be performed by the camera 1100 in FIG. 11. Steps 1202, 1204, 1206 of the method 1200 in FIG. 12 may be performed similarly to steps 502, 504, 506 in the methods 500 described with respect to FIG. 5.

In optional step 1205, additional data is provided to the controller(s) 1116 and the DLA 1114. In one embodiment, step 1205 is similar to step 705 in the method 700 in FIG. 7.

In step 1218, DLA results are optionally transmitted to one or more controller(s) 1116. Step 1218 is in one embodiment generally similar to step 707 in the method 700 of FIG. 7.

In step 1220, the controller(s) 1116 turn on/off, activate, and/or configure various camera functions. Step 1220 of the method 1200 encompasses activation/configuration of ISP, encoder, and output module (similar to steps 712, 714, 716).

However, step 1220 of FIG. 12 also includes optional activation/configuration of the image sensor(s) 1102 and additional camera components 1118. In one embodiment, step 1220 is at least partially dependent on one or more of: results/data obtained from the DLA 1114 and instructions/data obtained from additional camera components 1118.

In one embodiment, one or more additional camera components 1118 (e.g., wireless transceiver, non-image sensors, a GPS tracker) are activated or configured based on data obtained from the additional camera components 1118 (e.g., a specific time or atmospheric reading). In one embodiment, one or more additional camera components 1118 are activated or configured based on DLA results.

In one embodiment of step 1220 of the method 1200, the controller(s) 1116 configure or activate at least portions of the image sensor(s) 1112. In one variant, the image sensor(s) include a first image sensor that is active by default and a second image sensor that may be activated by the controller(s) 1116 in response to a DLA result. For example, the second image sensor can be activated in response to a determination by the DLA 1114 that not enough data is being collected.

In one variant, the image sensor(s) include one or more photosensor arrays including first and second configurations; and the controller(s) activate first or second configurations based on DLA results. Multiple (e.g., three or more) different configurations of active photosensors can be selected by the controllers 1116 based on DLA results. The controllers 1116 may also selectively apply a particular filter to the image sensors 1102, configure a camera shutter speed, activate a camera flash, etc.

In step 1208, the DLA results are saved, transmitted, or discarded. The memory device 1110 and transmitter 1112 may be configured by the controllers 1116 (in step 1220) based on DLA results and/or additional data.

Figure 13:
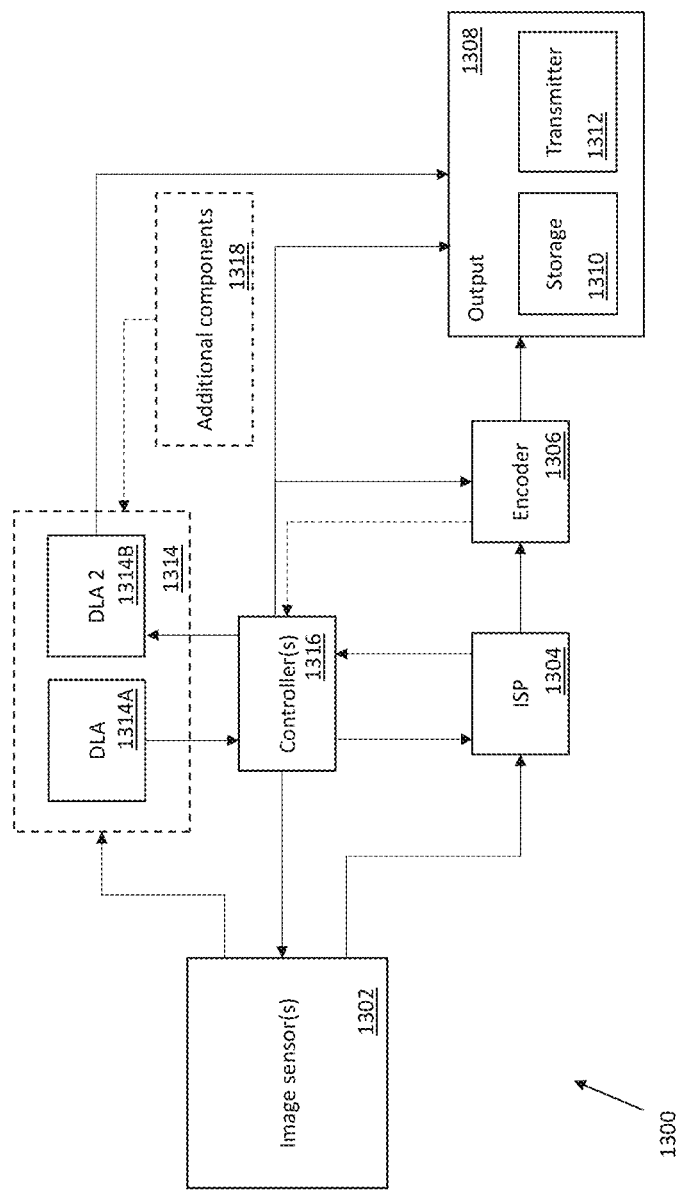
FIG. 13 is a functional block diagram illustrating yet another exemplary embodiment of a camera apparatus in accordance with aspects of the present disclosure.

FIG. 13 is a logical block diagram of another embodiment of a camera apparatus 1300 that includes a DLA 1314 having multiple (here, two) separate deep learning processes, and an ISP 1304 that at least partially affects the function of the DLA 1314. In one variant, the two deep learning processes are performed on two different deep learning accelerator devices 1314A and 1314B, although other configurations may be used (such as e.g., a multi-core device capable of running multiple DLA algorithms in parallel). The controllers 1316 of the camera 1300 may configure and/or activate the image sensor(s) 1312, the DLA 1314, and the ISP 1304.

Figure 14:
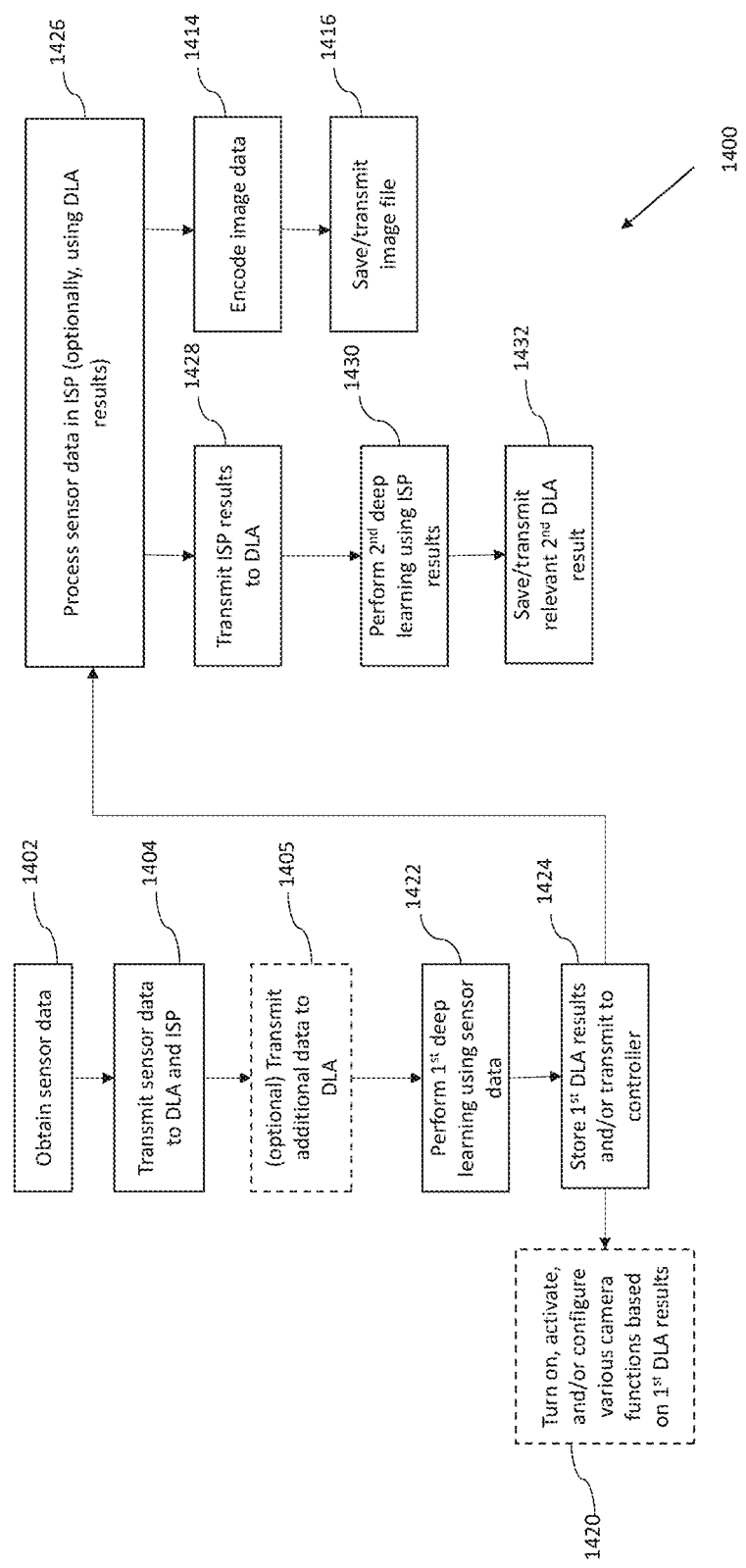
FIG. 14 is flow diagram of a method of processing image sensor data using the camera apparatus of FIG. 13.

FIG. 14 is a logical flow chart illustrating one embodiment of a method 1400 which may be performed by the camera 1300 of FIG. 13.

In step 1402, image sensor(s) 1402 obtain sensor data. Step 1402 may be implemented similarly to the step 502 of obtaining sensor data described with respect to the method 500 of FIG. 5.

Steps 1404 and 1405 of the method 1400 may be conducted similarly to steps 504 and 505 of one of the previous methods (e.g., the method 500 in FIG. 5). Note that additional data is not provided to the controller(s) 1416 in the method 1400 of FIG. 14; however, the method may be modified such that step 1405 is performed similarly to step 705, described with respect to the method 700 in FIG. 7.

In step 1422, a first deep learning process is performed using at least the sensor data obtained in step 1404. In one implementation, the first deep learning process is a face detection process performed by a first DLA 1314.

In step 1424, the first deep learning process results may be stored and/or provided to the controller(s). For example, the DLA 1314 may determine that a face has been detected by the image sensors 1302 and provide this result to the controllers 1316.

In optional step 1420, various camera functions are turned on/off or configured by the controllers 1316 based on first deep learning process results. This step may be similar to step 1220 of the method 1200, described with respect to FIG. 12. That is, based at least in part on the first deep learning process results, the controller(s) 1316 optionally activate, deactivate, or configure the image sensor(s) 1302, the additional camera components 1318, the ISP 1304, the encoder 1306, and the output module 1308.

In step 1426, sensor data is processed by the ISP 1304. In one embodiment, step 1426 is performed without interference by the controllers 1316 and is not dependent on DLA results (obtained in step 1424). In another embodiment, step 1426 is at least partially dependent on first DLA results obtained in step 1424. This type of potential dependence is described above with respect to step 712 of method 700. In one embodiment, the ISP 1304 is inactive by default and only activates in response to a specific result from the first deep learning process (e.g., a face has been detected). In step 1414, the image data is encoded by the camera encoder 1306 and in step 1416, the encoded image/video file is saved and/or transmitted by the camera apparatus 1300.

In parallel step 1428, the ISP 1304 transmits processed image data to the DLA 1314 (directly or via the controller(s) 1316). In one embodiment, the processed image data is in a recognizable image file format and can be easily compared to other standard digital images.

In step 1430, a second deep learning process is performed. The second deep learning process uses the image data provided by the ISP 1304. In one embodiment the second deep learning process is performed by a second DLA 1314B. In one implementation, the second deep learning process includes facial identification/authentication.

In step 1432, the result of the second deep learning process is saved and/or transmitted.

In the sensor processing method 1400 described in FIG. 14, an initial, relatively simple/quick deep learning process (e.g., facial detection) may be performed by a deep learning accelerator using direct sensor data.

If the initial deep learning process does not find anything of relevance, the other camera functions do not need to be activated. In one embodiment, only the image sensor(s) 1302 and first DLA 1314A are active by default, and only if the initial deep learning process finds something of relevance, one or more of the other camera functions are activated. In one variant, the other camera functions include at least one other deep learning process (e.g., facial identification). In one implementation, the at least one other deep learning process is configured to evaluate image data (i.e., post-ISP data). In one variant, a low power configuration of the image sensor(s) 1302 and the first DLA 1314A are active by default, and at least a higher power configuration of the image sensor(s) 1302 can be activated based on a specific result of the first DLA 1314A (e.g., a face is detected).

Exemplary Image Sensors

Figure 15C:
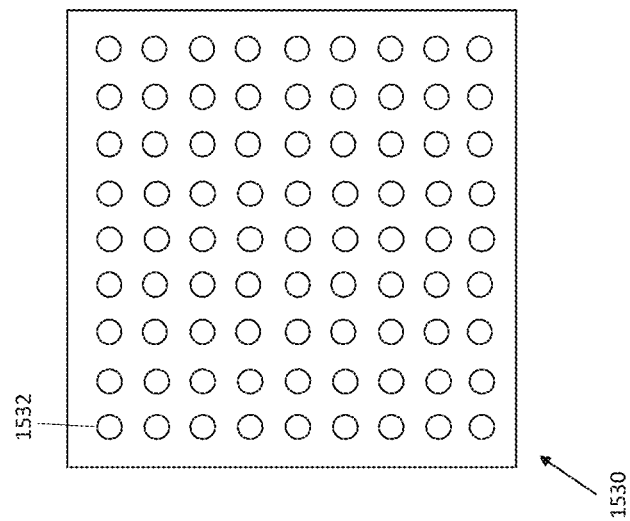
FIGS. 15A-15C illustrate various exemplary embodiments of photosensor arrays that may be used in imaging devices configured according to the present disclosure.
Figure 15B:
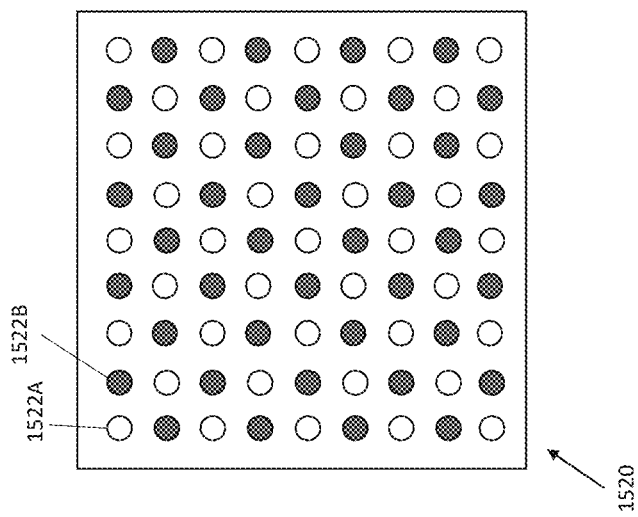
Figure 15A:
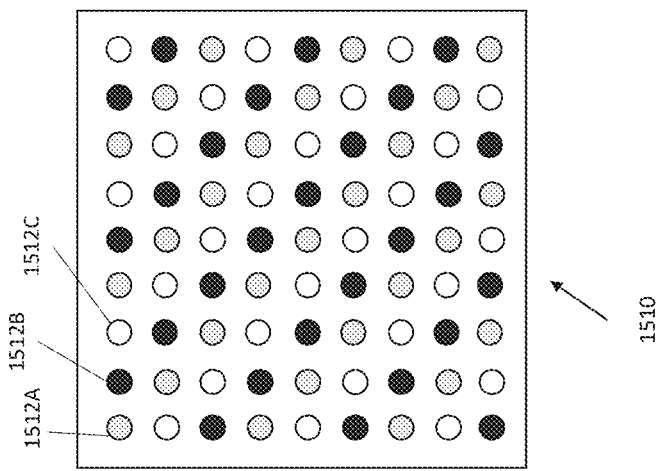

An imaging (e.g., camera) apparatus configured according to the present disclosure may also include in various embodiments (i) one or more conventional image sensors (i.e., those optimized for display to a human), and/or (ii) one or more specialized image sensors (i.e., not optimized for computer or human display, but rather for analytics of the type previously described). FIGS. 15A-15C illustrate exemplary embodiments of photosensor arrays that may be used in such specialized image sensors (ii).

For example, FIG. 15A illustrates a photosensor array 1510 including three different kinds of photosensor elements 1512A/1512B/1512C. The different photosensor elements might detect light in different frequency/wavelength ranges, for example either via different wavelength filters formed over light sensing junction areas of individual photosensors, or via different properties of semiconductor materials forming the light sensing junctions.

As a brief aside, a conventional photosensor array might include three different kinds of photosensor elements that detect light within color ranges that correspond to computer display, e.g., red/green/blue (RGB) or cyan/yellow/magenta (CYM). Such conventional photosensor array may also include proportionally more green light detectors, in order to account for the fact that the human eye is more sensitive to green light as noted supra.

Moreover, a conventional image sensor may include a color filter array constructed to obtain data specifically with computer display standards and/or human perception in mind (e.g., Bayer filter, RGB filters, etc.). These might include color filter arrays detect light in color ranges that are easily translated to computer display (RGB or CYM) and color filter arrays that detect green light better than other types of light. A conventional image sensor may also have a specific range of photosensor light sensitivity (i.e., within an exposure range that is easily perceived by the human eye) and a photosensor array that is dense enough to generate an acceptable image for display.

However, a photosensor array used to generate sensor data for DLA evaluation and not for display does not need to follow the above conventions, and in fact such features may detract from the efficacy and/or efficiency of such specialized sensor configurations in applications where their output is used as an input to a DLA or other analytics process. When obtaining data for computer display is not the primary task of the camera, specialized image sensors might include unconventional color filter arrays, photosensor sensitivity ranges, and/or photosensor element density.

FIG. 15A illustrates a first type of specialized photosensor array 1510 that may be used in accordance with the present disclosure. In one embodiment, the photosensor array 1510 includes RGB photosensor elements 1512A/1512B/1512C in equal proportions. In one embodiment, the photosensor array 1510 includes photosensor elements 1512A/1512B/1512C that correspond to non-conventional wavelength ranges. In one implementation, the first photosensor elements 1512A detect light with wavelengths of 400-450 nm (blue), the second photosensor elements 1512B detect light with wavelengths of 450-550 nm (blue and green), and the third photosensor elements 1512C detect light with wavelengths of 550-700 nm (yellow, orange, red).

In another variant, the photosensor array 1510 includes photosensor elements that detect non-visible light. For example, in one implementation, the first photosensor elements 1512A detect electromagnetic waves having wavelengths 10E−7m to 400 nm (part of UV spectrum), the second photosensor elements 1512B detect electromagnetic waves having wavelengths 400 to 700 nm (entire visible spectrum), and the third photosensor elements 1512C detect electromagnetic waves with wavelengths 700 nm to 10E-5 (part of IR spectrum). Since the specialized photosensor array 1510 is not limited to colors related to traditional computer displays, any combination of wavelength ranges might be successfully used in the various photosensors 1512A, 1512B, and 1512C. For example, the detected ranges may be chosen based on ease or cost of manufacturing, the specific photosensor junctions, and/or color filter availability and configuration.

FIG. 15B illustrates a second exemplary type of specialized photosensor array 1520 that may be used in accordance with the present disclosure. The photosensor array 1520 includes only two types of photosensor elements 1522A/1522B. FIG. 15B illustrates the different photosensor elements formed in equal proportions, but the photosensor array 1520 might include more of the first photosensor elements 1522A than the second photosensor elements 1522B, or vice versa. In one implementation, the first photosensor elements 1522A detects light in the range of 400-550 nm wavelengths, and the second photosensor elements 1522B detects light in a range of 550-700 nm wavelengths, but these values are purely illustrative and others may be chosen.

FIG. 15C illustrates another type of specialized photosensor array 1530 that may be used in accordance with the present disclosure. The photosensor array 1530 includes identical photosensor elements 1532 with no color filter array. This "simplified" photosensor array 1530 could not be used to generate a fully-featured color image/video such as for human display purposes; however, a deep learning accelerator or at least some other analytic processes do not necessarily need color information (at least to the level of a traditional sensor array), and may be configured to use the extra data corresponding to amounts of light detected at each photosensor pixel for other purposes, such as e.g., for compensation.

Yet another type of specialized photosensor array (not shown) may include a color filter array having random or semi-random placement of different color filters. This type of photosensor array configuration would be largely useless in generating an image for display. However, a camera apparatus with a deep learning accelerator (DLA) specifically "trained" via the specialized photosensor array might be useful for other purposes, such as for watermarking or to authenticate/verify live recordings. Security and privacy purposes may alternatively or additionally be supported.

Figure 16C:
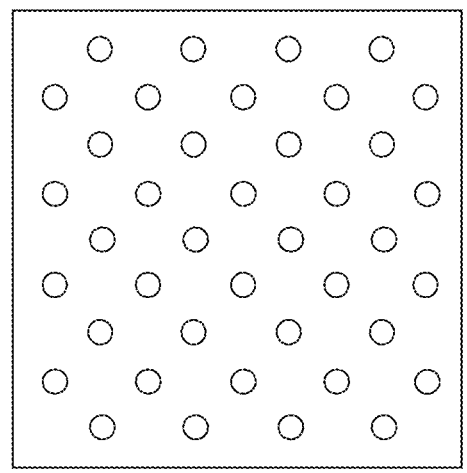
FIGS. 16A-16E illustrate different configurations of an exemplary photosensor array that may be selected utilizing one or more methods of the present disclosure.
Figure 16B:
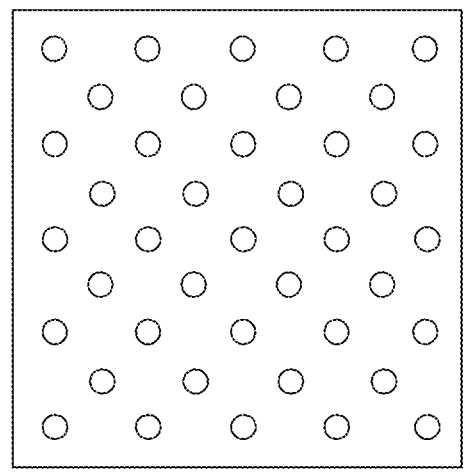
Figure 16A:
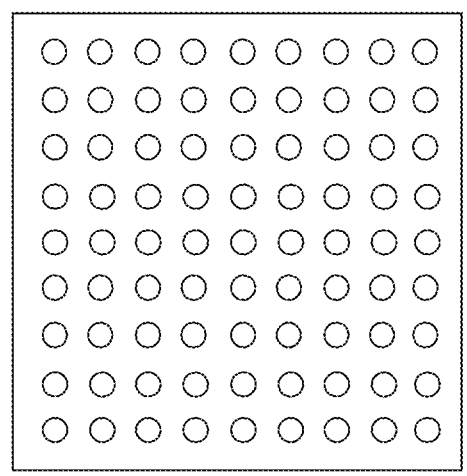
Figure 16E:
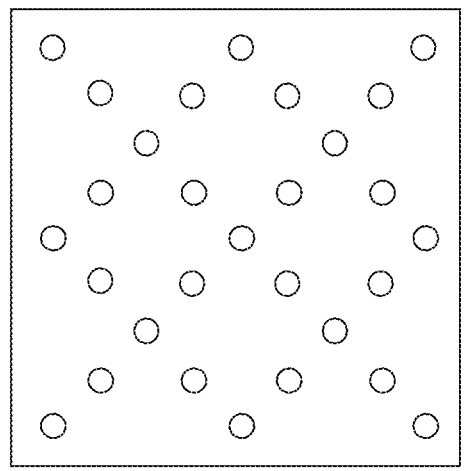
Figure 16D:
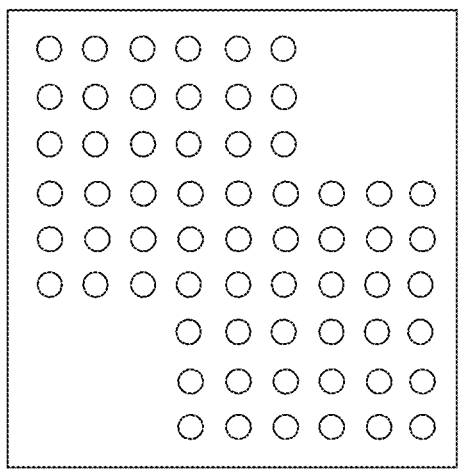

FIGS. 16A-16E illustrate an arrangement of pixels in an exemplary photosensor array (FIG. 16A), and different configurations of active photosensor pixels (FIGS. 16B-16E) that may be used therewith, such as in a camera apparatus according to aspects of the present disclosure. The different color photosensors are not indicated in FIGS. 16A-16E; however, it will be appreciated that any configuration of color filter arrays can be applied. In one embodiment, the configuration of the active photosensor elements in the device 1600 of FIG. 16A represents a first image sensor mode, corresponding to a higher power usage including collection of data that may be used to generate an image for display. Any of the configurations 1602, 1604, 1606, 1608 of active photosensors (FIGS. 16B-E) each represent possible alternate image sensor modes, corresponding to a lower power usage by the camera apparatus (due to reduced data gathering and processing requirements). A photosensor array operating in one of the alternate image sensor modes illustrated might not generate enough of, or the kind of, data that could be used to successfully generate an image for display (or at least one having all of the attributes desired by humans for normal display images). However, the alternate sensor modes may be used by a camera apparatus operating in a low-power mode and collecting sensor data for evaluation by a DLA, and/or for generation of images which may not be for display (e.g., which may be processed by other processes or algorithms other than the DLA, and which may not require the complete complement of data required for a typical display image).

In one variant, operation of the image sensor(s) in a first mode comprises using a first set of photosensor elements within the array(s), and operation of the image sensor in the second mode comprises using a second set of photosensor elements. In one implementation, the first set includes all of or part of the second set (i.e., the second set is a subset of the first). For instance, the first set of photosensor elements may comprise all photosensor elements of the photosensor array and the second set comprises a portion/percentage of all the photosensor elements.

In another implementation, the first and second sets of photosensor elements have only partial overlap, while in another the first and second sets do not overlap at all (i.e., the sets are completely discrete from one another logically, but not necessarily spatially).

In some implementations, the first set of photosensor elements includes photosensor elements that operate within a predetermined acceptable range of light sensitivity (e.g., for display/human perception) and the second set of photosensor elements includes at least some photosensor elements that operate outside of the predetermine acceptable range of light sensitivity (i.e. over or under exposed). In some configurations, these levels are reprogrammable (such as based on applied control or bias voltages to the sensor elements or portions thereof under command or e.g., a controller such as e.g., a microcontroller operative within the camera apparatus.

The first set of photosensor elements may also include more photosensor elements than the second set of photosensor elements.

In some implementations, the second set of elements includes every N-th photosensor element of the photosensor array, where N≥2 or more. The second set may also only utilize photosensor elements within one or more particular region(s) of the photosensor array (e.g., middle region, top region, side regions, periphery, etc.).

Applications

Aspects of the present disclosure may be applied to various systems requiring analytics, such as e.g., artificial intelligence or machine learning evaluation of camera or other sensor data. The general concept of evaluating direct sensor data using an in-device deep learning or AI accelerator may be especially useful in isolated devices such as camera systems, where an evaluation needs to be done quickly and/or in a highly power efficient manner.

In one exemplary application, a security camera is configured to continuously capture sensor data and transmit image sensor data directly to a deep learning accelerator (DLA). The security camera may be part of a smart home network, commercial premises, government/military premises, road/highway camera system, etc. In one embodiment, the security camera is configured to generate image/video files, and save and transmit the images/video only if the DLA determines that the images/video are "relevant" according to one or more predetermined parameters or criteria. For instance, the DLA in the security camera may be configured perform one or more of: (i) face/human detection, (ii) detection of suspicious activity, (iii) detection of dangerous activity, (iv) detection of dangerous objects, and/or (v) detection of certain types of movement of detected objects within frame (e.g., seismic events due to S or P wave excursions).

In one implementation, the security camera is configured to (i) perform face detection using direct sensor data and (ii) in response to detection of a face, perform facial identification using post-ISP image data.

In another configuration, an "anti-spoof" camera is configured to capture image/video, and label or stamp the captured images as (i) having been recorded live (i.e., not manufactured by an artificial intelligence), and (ii) not digitally altered or manipulated. In one such approach, the anti-spoof camera includes one or more image sensors directly connected to both a DLA and an ISP. In one embodiment, the DLA is configured to determine that the sensor data provided to the DLA has also been collected by the specific image sensor of the camera, thereby providing validation of the data. In one variant, the anti-spoof camera is configured to, based on the DLA determination, label corresponding image/video (processed by the ISP) as authentic or validated. Other types of comparison processing between the two data processing chains (i.e., ISP and DLA) can be conducted as well.

Aspects of the present disclosure may further be applied to e.g., a remote wildlife camera (e.g., for use in the wild or in a zoo/preserve). In one embodiment, the remote wildlife camera may be attached to a drone. In another embodiment, the remove wildlife camera is attached to a land rover. In another embodiment, the remote wildlife camera may be a stationary camera, such as one mounted on a tree or in a blind. In yet another embodiment, the remote wildlife camera is an underwater camera attached to an underwater vehicle, or as a stationary underwater camera.

One or more image sensors in the remote wildlife camera(s) referenced above are, in one embodiment, configured to directly provide sensor data to a DLA and to perform one or more DLA algorithms on the direct sensor data. Specifically, the DLA is configured to perform one or more of: (i) detection of a specific animal/bird/other organism, (ii) detection of specific animal behavior, or (iii) detection of a specific geologic structure or feature.

In one implementation, the remote camera is configured to operate in a low power mode or "sleep state" until the DLA detects or identifies an object of relevance. For example, the image sensor may periodically collect image data (e.g., at a prescribed sampling frequency) and DLA-process at least portions of the data to detect one or more objects of interest. In some variants, the remote camera is configured to, in response to detection of an object of relevance, switch to a higher power mode. For instance, operation in the low power mode includes operation of a DLA and a low-power image sensor/image sensor configuration, and operation in the higher power mode includes an additional operation of an ISP. Switching to the higher power mode may also include turning on a wireless transmitter and transmitting one or more of: (i) captured image/video, (ii) DLA results data, (iii) non-imager sensor data, (iv) previously saved data, and/or (v) location information. The switch to a higher power mode may also include turning on a wireless receiver and listening for a predetermined signal.

Aspects of the present disclosure may also be applied to user device cameras (e.g., smartphone/mobile device, laptop, and webcam camera devices). In one embodiment, the user device camera is configured to operate in a low power mode by default, wherein the low power mode includes collecting image sensor data and evaluating direct sensor data using one or more DLAs. In one variant, the user device camera is configured to switch to a higher power mode in response to a specific DLA result, such as where the low power mode does not include any image generation/processing via an ISP, and the higher power mode includes activation of at least one ISP. In another variant, the low power mode includes utilization of a first type or degree of image signal processing, and the higher power mode includes a second and/or degree of image signal processing (e.g., more complex filtering, demosaicing, stitching, or other more computational intensive processes) which require more time and/or power than the first type/level image signal processing.

In yet other applications, aspects of the present disclosure may be applied to a camera or other device used for users with a visual impairment. In one embodiment, the camera/device includes a continuous DLA evaluation that is performed quickly and/or using minimum power on direct image sensor data. For instance, the camera may be configured to quickly detect specific objects and/or dangerous situations (e.g., busy street, furniture in a path of traversal in the user's house, etc.) and perform a particular function based on the detection (e.g., send a warning/notification to the user). In one such configuration, the camera/device does not include any image signal processing, and/or the image sensor is not configured to capture data used for image display. In one implementation, the camera apparatus and method described in FIGS. 9 and 10, respectively, may be applied to a camera or other device for such users.

Aspects of the present disclosure may also be applied to vehicle cameras (e.g., to detect objects/people for automated driving), satellite cameras (e.g., to detect weather patterns, natural phenomena, military movements), industry automated inspection cameras, remote equipment/infrastructure inspection cameras, sport event cameras (e.g., to track/analyze players or sports objects), as well as other types of "non-camera" applications such as acoustic Doppler systems, radar systems, X-ray spectrometers (e.g., astrophysics-based applications for detecting stars, black holes, or other cosmic objects or features), and even electron microscopes.

Exemplary Physical Implementations

Referring now to FIGS. 17A-17D, various exemplary embodiments of a physical implementation of the various methods and apparatus disclosed herein are shown and described. It will be appreciated that these embodiments are merely some of the possible ways of realizing a physical device, and accordingly the disclosure is in no way limited thereto.

Figure 17A:
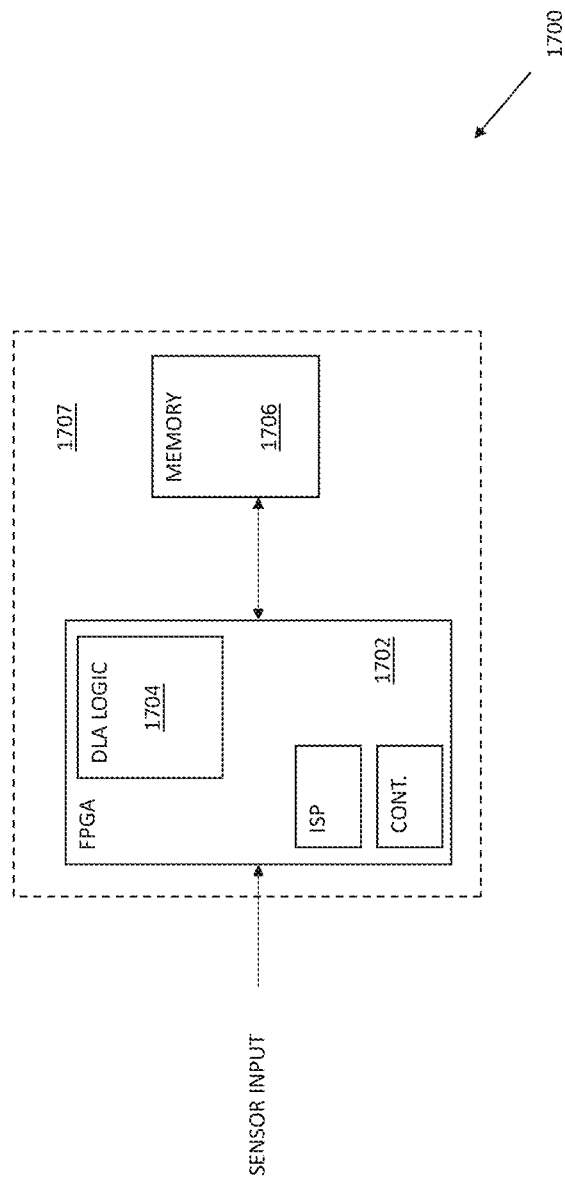
FIGS. 17A-17D illustrate various exemplary configurations of physical devices implementing the methods and apparatus of the present disclosure.
Figure 17B:
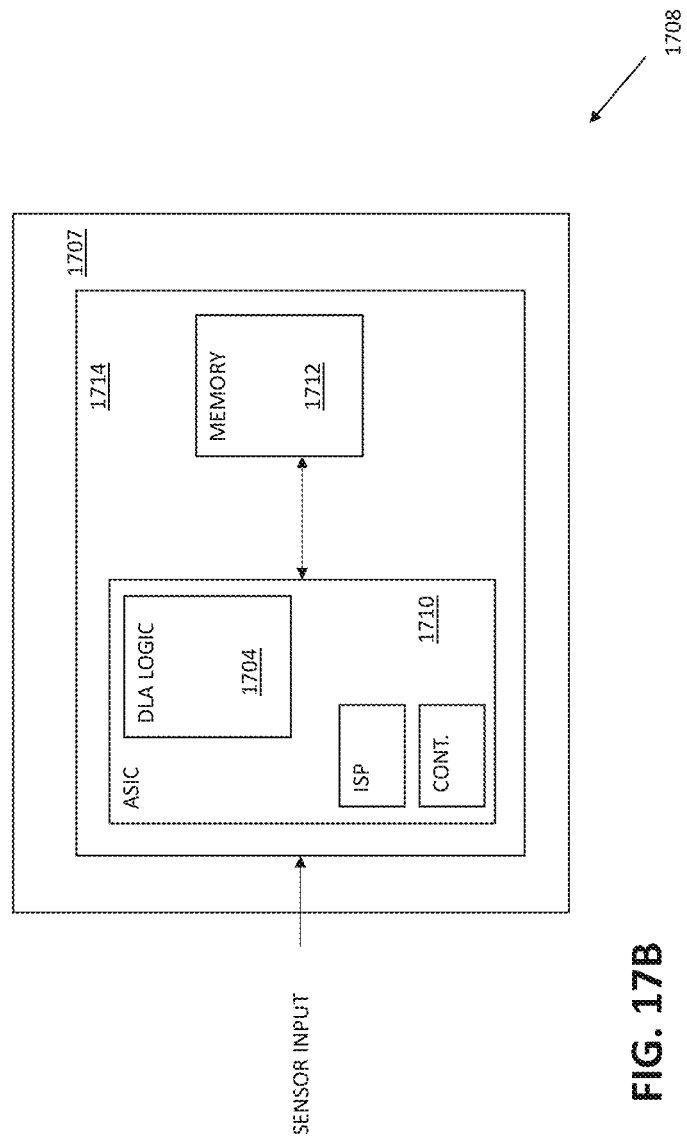

Referring to FIG. 17A, a DLA-enabled device 1700 is shown that includes a separate FPGA 1702 (configured with DLA logic 1704, such as in the form of reprogrammable FPGA logic blocks or the like) along with a memory/storage device 1706 which may each be mounted on e.g., a common substrate such as a PCB 1707. This embodiment has the benefits of, inter alia, re-programmability and substantial utility during testing, including testing with different types and/or configurations of memory or storage devices. For instance, standardized protocols or interfaces can be used to test various types of logic within the DLA-enabled FPGA 1702 in conjunction with different types of memory, such as e.g., GDDR6, HBM2, 3D memory of other types (such as X-point).

In another embodiment (FIG. 17B), an DLA-enabled ASIC 1710 is used as part of the device architecture 1708. In one embodiment, the ASIC 1710 is closely coupled with memory and storage 1712 (e.g., on the same interposer 1714 in one implementation). In contrast to the FPGA, the ASIC has the advantages of, inter alia, significantly higher speed for logic operations, yet with loss of some re-programmability/reconfigurability. Such ASIC may represent for instance a further evolution than the FPGA-based device between a test device and an actual production DLA-based device, including higher die/area efficiency and more accurate modeling of real-world implementation such as signal timing, etc.

In yet another embodiment (FIG. 17C), a single-chip DLA-based solution 1720 with memory/storage 1722 residing on the same chip (die) 1724 as the DLA logic 1726 is disclosed, and separate ICs for e.g., the ISP and controller functions as applicable. For instance, in one variant, a BGA type IC interface may be used to interface the various ICs with the parent PCB 1707, including for sensor input and other interfaces.

Figure 17C:
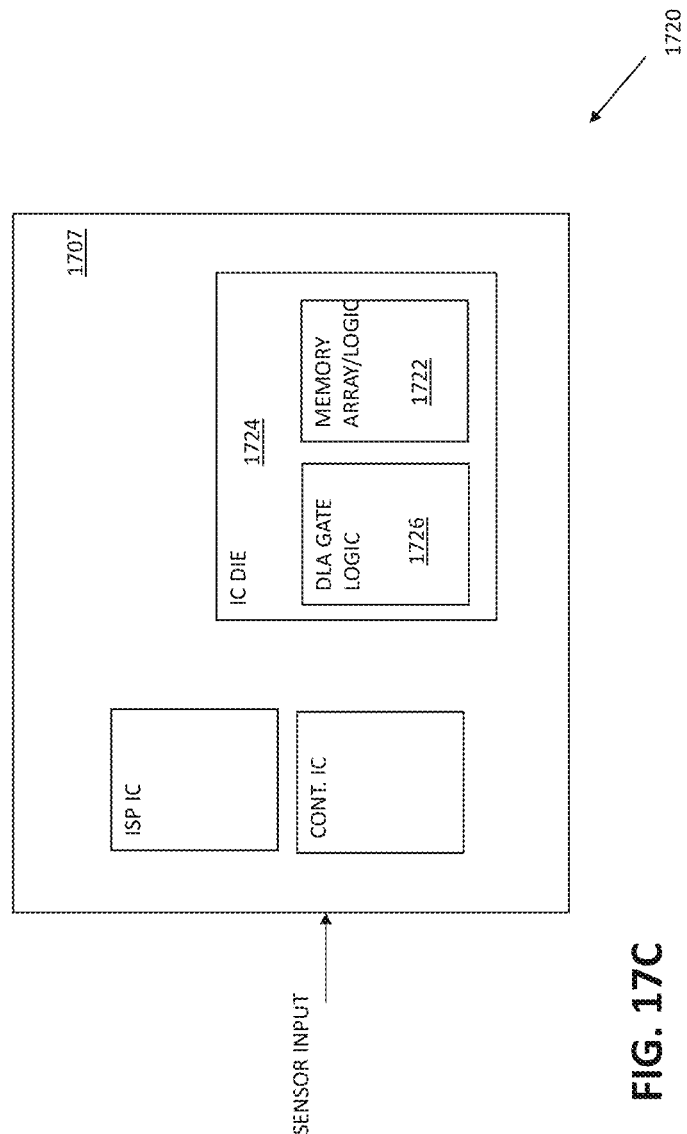
Figure 17D:
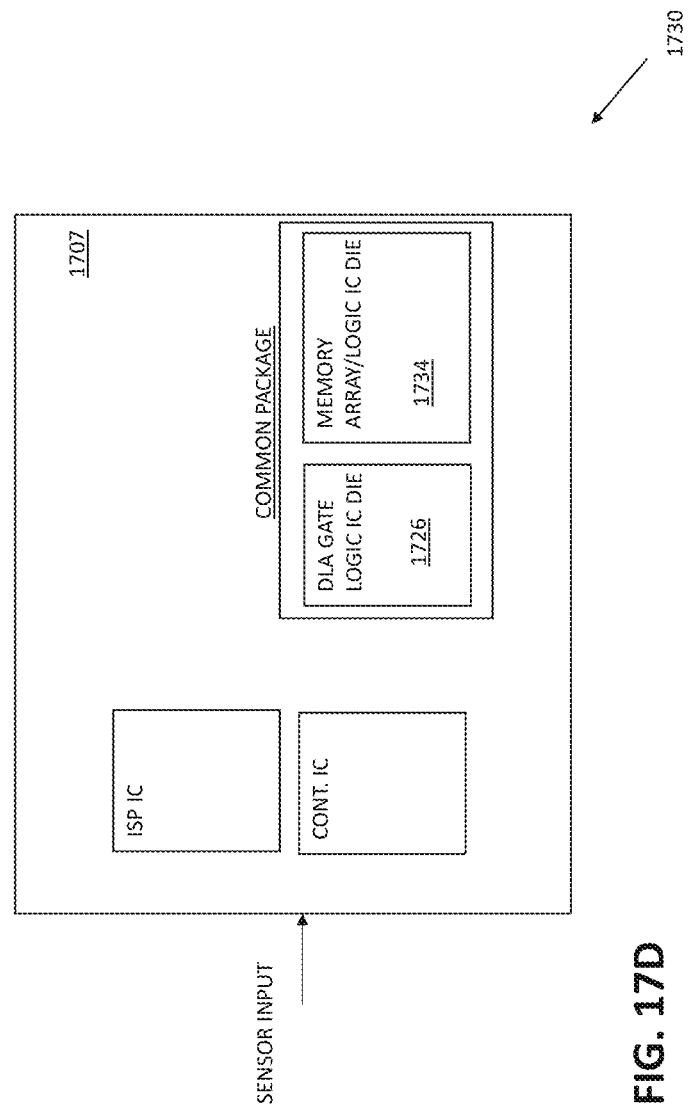

Similarly, in the embodiment of FIG. 17D, a multi-chip, single package solution 1730 with memory/storage residing on one or more adjacent pieces of silicon 1734 is shown. These latter embodiments of FIGS. 17C and 17D represent, for instance, final or near-final steps in the production evolution of the DLA-based device; i.e., actual production devices which may be used for instance in customer computerized platforms such as camera-equipped mobile devices, DLA-based GPUs, supercomputers, and other platforms.

It will also be appreciated that one or more functions of the various configurations shown herein may be "virtualized", including implemented in cloud-based or off-device processes. For instance, so-called 5G NR is designed to, when it reaches its full potential, meet 1 ms round trip latency times. As such, functions which were previously required to be coupled in hardware to each other may feasibly be disposed off-chip and off-device, such that e.g., necessary DLA or ISP processing functions can be implemented in a network process, with final or interim results returned to the device as required.

ADDITIONAL CONSIDERATIONS

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein. Furthermore, features from two or more of the methods may be combined.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM or ROM of any type, electrically erasable programmable read only memory (EEPROM), compact disk (CD) ROM or other optical disk storage, magnetic disk storage or other magnetic storage devices, solid state storage (e.g., SSD), or any other non-transitory medium that can be used to carry or store desired program code means in the form of instructions or data structures and that can be accessed by a general purpose or special-purpose computer, or a general-purpose or special-purpose processor or processor array. Also, any connection is properly termed a computer-readable medium.

What is claimed is:

1. An electronic apparatus configured to perform at least one machine learning task, the electronic apparatus comprising:
    a sensor apparatus; and
    machine learning accelerator logic in data communication with the sensor apparatus, the machine learning accelerator logic comprising at least one machine learning algorithm configured to utilize unprocessed data from the sensor apparatus to generate machine learning results, wherein the utilization of the unprocessed data to generate machine learning results comprises the electronic apparatus performing at least the following tasks:
        perform a first deep learning process utilizing at least the unprocessed data to generate one or more first machine learning results;
        provide the one or more first machine learning results to a controller apparatus of the electronic apparatus, the controller apparatus configured to cause (i) at least one of: (a) a configuration, (b) an enablement, or (c) a disablement, of one or more functions of the electronic apparatus, and (ii) processing of the unprocessed data in accordance with the at least one of (a), (b), or (c); and
        perform a second deep learning process utilizing at least the processed sensor data to generate one or more second machine learning results.

2. The electronic apparatus of claim 1, wherein the machine learning accelerator logic comprises an integrated circuit configured as a deep learning accelerator.

3. The electronic apparatus of claim 2, wherein:
    the electronic apparatus comprises a camera apparatus; and
    the deep learning accelerator comprises one or more objects or facial recognition algorithms.

4. The electronic apparatus of claim 1, wherein:
    the electronic apparatus comprises a camera apparatus; and
    the sensor apparatus comprises at least one photosensor array including at least first photosensor elements and second photosensor elements, wherein at least one of the first photosensor elements or the second photosensor elements is configured to detect light within a human-visible spectrum.

5. The electronic apparatus of claim 1, wherein:
    the electronic apparatus comprises a camera apparatus; and
    the sensor apparatus comprises at least one photosensor array including at least a first plurality of photosensor elements and second plurality of photosensor elements, wherein at least one of the first or second pluralities of photosensor elements is configured to detect light outside of a visible spectrum.

6. The electronic apparatus of claim 5, wherein the at least one of the first or second pluralities of photosensor elements is configured to at least detect ultraviolet light.

7. The electronic apparatus of claim 5, wherein the at least one of the first or second pluralities of photosensor elements is configured to at least detect infrared light.

8. The electronic apparatus of claim 1, further comprising an image signal processor apparatus configured to apply at least one image processing function to the unprocessed data based at least on the machine learning results.

9. The electronic apparatus of claim 8, further comprising an image encoding apparatus configured to apply at least one image encoding function to processed data output from the image signal processor apparatus, the encoding determined at least in part by data output from the machine learning accelerator logic.

10. A method of operating an electronic apparatus to perform at least one machine learning task, the method comprising:
    receiving sensor data from a sensor apparatus; and
    utilizing a machine-learning based processing entity to generate one or more machine learning results from the sensor data, wherein the utilizing the machine-learning based processing entity to generate the one or more machine learning results comprises:
        performing a first deep learning process utilizing at least the sensor data to generate one or more first machine learning results;
        providing the one or more first machine learning results to a controller apparatus of the electronic apparatus, the controller apparatus configured to cause (i) at least one of: (a) a configuration, (b) an enablement, or (c) a disablement, of one or more functions of the electronic apparatus, and (ii) processing of the sensor data in accordance with the at least one of (a), (b), or (c); and
        performing a second deep learning process utilizing at least the processed sensor data to generate one or more second machine learning results.

11. The method of claim 10, wherein the receiving of the sensor data from the sensor apparatus comprises receiving, selectively at least one of: (i) an image signal processor apparatus of the electronic apparatus or (ii) a deep learning accelerator apparatus of the electronic apparatus, pre-raw format image data that is completely unprocessed, from one or more image sensors.

12. The method of claim 11, wherein the receiving, selectively at least the one of: (i) the image signal processor apparatus of the electronic apparatus or (ii) the deep learning accelerator apparatus of the electronic apparatus, the pre-raw format image data is based at least in part on at least one of (i) data relating to a battery power of the electronic apparatus, or (ii) processing overhead associated with processing the pre-raw format image data at the image signal processor apparatus.

13. The method of claim 10, wherein:
    the receiving of the sensor data from the sensor apparatus comprises receiving, at an image signal processor apparatus, raw format image data from one or more image sensors; and
    the method further comprises performing, using at least the image signal processor apparatus, at least one of (i) demosaicing or (ii) de-Bayering on the raw format image data to generate partially processed sensor data; and
    wherein the utilizing the machine-learning based processing entity to generate the one or more machine learning results from the sensor data comprises the image signal processor apparatus transmitting the partially processed sensor data to a deep learning accelerator apparatus, the deep learning accelerator apparatus configured to evaluate the partially processed sensor data to generate the one or more machine learning results.

14. The method of claim 10, wherein:
the receiving of the sensor data from the sensor apparatus comprises receiving, at a deep learning accelerator apparatus, partially processed sensor data from an image signal processor apparatus, the deep learning accelerator apparatus comprising at least one of (i) an object detection algorithm or (ii) an object recognition algorithm; and
the method further comprises utilizing the deep learning accelerator apparatus to perform at least one of (i) detection or (ii) recognition of one or more of (a) a subject or (b) object.

15. The method of claim 10, wherein the utilizing the machine-learning based processing entity to generate the one or more machine learning results comprises iteratively evaluating a plurality of successive sets of the sensor data to converge on a learning hypothesis.

16. The method of claim 10, wherein: the first deep learning process comprises a detection process of one or more objects; and the second deep learning process comprises at least one of (i) an identification of, or (ii) an authentication of, the one or more objects.

17. A computer readable apparatus comprising a non-transitory storage medium, the non-transitory storage medium comprising at least one computer program having a plurality of instructions, the plurality of instructions configured to, when executed on a processing apparatus, cause an electronic apparatus to:
obtain sensor data via at least one sensor apparatus of the electronic apparatus, the obtainment of the sensor data comprises:
obtainment of first sensor data via operation of at least one first image sensor apparatus of the electronic apparatus in a first mode; and
obtainment of second sensor data via operation of at least one second image sensor apparatus of the electronic apparatus in a second mode; and
evaluate the sensor data via use of deep learning logic, wherein the evaluation of the sensor data via use of the deep learning logic comprises:
evaluation of the first sensor data via use of a first deep learning logic; and
evaluation of the second sensor data via use of a second deep learning logic after the processing of the second sensor data.

18. The computer readable apparatus of claim 17, wherein the sensor data comprises data obtained by a photosensor array that has not been processed by an image signal processor.

19. The computer readable apparatus of claim 17, wherein:
the obtainment of the first sensor data via the operation of the at least one first image sensor apparatus of the electronic apparatus in the first mode comprises obtainment of sensor data that corresponds to a light exposure that is considered to be within an acceptable range for human perception; and
the obtainment of the second sensor data via the operation of the at least one second image sensor apparatus of the electronic apparatus in the second mode comprises obtainment of at least some sensor data that corresponds to light exposure that is considered to be of outside of the acceptable range.

20. The computer readable apparatus of claim 17, wherein:
the operation of the at least one first image sensor apparatus of the electronic apparatus in the first mode comprises provision of a first amount of power to all of a plurality of photosensor elements of a photosensor array; and
the operation of the at least one second image sensor apparatus of the electronic apparatus in the second mode comprises provision of a second amount of power to at least one of (i) all or (ii) select ones, of the plurality of photosensor elements of the photosensor array, wherein the first amount of power is greater than the second amount of power.

* * * * *